United States Patent
Tam et al.

(10) Patent No.: US 6,284,865 B1
(45) Date of Patent: Sep. 4, 2001

(54) POLYMERIC PHOSPHITE COMPOSITION AND HYDROCYANATION OF UNSATURATED ORGANIC COMPOUNDS AND THE ISOMERIZATION OF UNSATURATED NITRILES

(75) Inventors: Wilson Tam, Boothwyn, PA (US); Sigridur Soley Kristjansdottir; Robin Nikolas Greene, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/399,261

(22) Filed: Sep. 20, 1999

(51) Int. Cl.$^7$ .................................................. C08G 63/692

(52) U.S. Cl. ............................ 528/287; 528/398; 528/491; 525/418; 525/420; 525/434; 525/437

(58) Field of Search ................................. 528/287, 398, 528/491; 525/418, 420, 434, 437

(56) References Cited

U.S. PATENT DOCUMENTS

| | | | |
|---|---|---|---|
| 3,496,215 | 2/1970 | Drinkard et al. | 260/465.8 |
| 3,631,191 | 12/1971 | Kane et al. | 260/439 |
| 3,655,723 | 4/1972 | Drinkard et al. | 260/465.3 |
| 3,766,237 | 10/1973 | Chia et al. | 260/465.3 |
| 4,171,298 | * 10/1979 | Minagawa et al. | 260/45.85 H |
| 4,293,472 | * 10/1981 | Minagawa et al. | 260/23 XA |
| 4,298,520 | * 11/1981 | Minagawa et al. | 260/45.8 R |
| 5,432,289 | 7/1995 | Pugin et al. | 549/221 |
| 5,512,696 | 4/1996 | Kreutzer et al. | 558/338 |
| 5,543,536 | 8/1996 | Tam | 556/13 |
| 5,573,641 | 11/1996 | Meade et al. | 162/158 |
| 5,688,986 | 11/1997 | Tam et al. | 558/338 |
| 5,710,306 | 1/1998 | Snijder et al. | |
| 5,723,641 | 3/1998 | Tam et al. | 556/13 |

FOREIGN PATENT DOCUMENTS

| | | | |
|---|---|---|---|
| WO 93/03839 | 3/1993 | (WO) | B01J/31/24 |
| 96/11182 | 4/1996 | (WO) . | |
| 99/06355 | 2/1999 | (WO) . | |

OTHER PUBLICATIONS

T. Jongsma, P. Kimkes and G. Challa, A new type of highly active polymer–bound rhodium hydoformylation catalyst, *Polymer*, 33, No. 1, 161–165, 1992 (no month).

Achim Kless, Claudia Lefeber, Anke Spannenberg, Rhett Kempe, Wolfgang Baumann, Jens Holz and Armin Börner, The First Chiral Early–Late Hetrobimetallic Complex—A Titanium (IV)–Palladium (II) Complex Based on Salenophos, *Tetrahedron*, 52, No. 46, 14599–14606, 1996 (no month).

Gregory D. Cuny and Stephen L. Buchwald, Practical, High–Yield, Regioselective, Rhodium–Catalyzed Hydroformylation of Functionalized α–Olefins, *J. Am. Chem. Soc.*, 115, 2068–2070, 1993 (no month).

Richard A. Bartsch, Yung Liu, Sang Ihn Kang, Byungki Son, Gwi Suk Heo, Paul G. Hipes and Lyndra J. Bills, Synthesis of Highly Lipophilic Crown Ether Carboxylic Acids, *J. Org. Chem.*, 48, 4864–4869, 1983 (no month).

Leonard E. Miller, W. W. Hanneman, W. L. Sr. John and R. R. Smeby, The Reactivity of the Methyl Group in 2–Methyl–3–nitronaphthalene, *JACS*, 76, 296–297, 1954 (no month).

Warren W. Kaeding, Oxidation of Phenols with Cupric Salts, *JOC*, 28, 1063–1067, Apr. 1963.

Fukiko Yamada, Tomihiro Nishiyama, Masahiro Yamamoto and Kazunori Tanaka, Substituted Bisphenols as Antioxidants for Autoxidation of Tetralin, *Bull. Chem. Soc. Jpn.*, 62, 3603–3608, Nov. 1989.

Wei–Bo Wang, Li–Lan Shi and Yao–Zheng Huang, An Efficient SbCl3–Metal System For Allylation, Reduction and Acetalization of Aldehydes, *Tetrahedron*, 46, No. 9, 3315–3320, 1990 (no month).

Martin Hovorka, Jana Günterova and Jiri Zavada, Highly Selective Oxidation Cross–Coupling of Substituted 2–naphthols: A Concenient Approach to Unsymmetrical 1,1'–binaphthalene–2,2'–diols, *Tetrahedron*, 31, No. 3, 413–416, 1990 (no month).

Harold R. W. Ansink, Erwin Zelvelder and Hans Cerfontain, Sulfonation of a series of naphthalenes containing two differens oxy substitutuents, *Recl. Trav. Chim. Pays–Bas*, 112, 216–225, 1993 (no month).

Donald L. Jameson, SHaron E. Hilgen, Conrad E. Hummel and Susan L. Pichla, Design and Synthesis of a Series of Facially Coordinating Tridentate Ligands Containing an H2O Donor Atom Set, *Tetrahedron*, 30, No. 13, 1609–1612, 1989 (no month).

(List continued on next page.)

Primary Examiner—Duc Truong

(57) ABSTRACT

A polymeric composition, a process for producing the composition, and a process for using the composition in, for example, hydrocyanation or isomerization are disclosed. The composition comprises repeat units derived from (1) a carbonyl compound, a monomer, and phosphorochloridite; (2) phosphorus trichloride, a polyhydric alcohol, and an aromatic diol; or (3) combinations of (1) and (2) in which the monomer can be a polyhydric alcohol, an amine, combinations thereof. The composition can further comprise a Group VIII metal and optionally a Lewis acid. The composition can be produced by (1) contacting a carbonyl compound with the monomer to produce an intermediate and contacting the intermediate with phosphorochloridite; (2) contacting phosphorus trichloride with a second polyhydric alcohol under a condition sufficient to produce a phosphorus-containing polymer and contacting the phosphorus-containing polymer with an aromatic diol; or (3) contacting an N,N-dialkyl dichlorophosphoramidite with a second polyhydric alcohol to produce a polymer phosphoramidite, contacting the polymer phosphoramidite with an acid such as HCl to produce the phosphorus-containing polymer, which is then contacted with an aromatic diol. The composition can be used as catalyst, for example, for converting an unsaturated organic compound to a nitrile and isomerizing a nitrile.

22 Claims, No Drawings

OTHER PUBLICATIONS

Anderson de Farias Dias, An Improved High Yield Synthesis of Dehydrodieugenol, *Phytochemistry*, 27, No. 9, 3008–3009, 1988 (no month).

J. Gloede, B. Costisella and H. Gross, Zur Halogenierung der o–Methoxyphenylester von P'''–Säuren, *Z. anotg. allg. Chem.*, 535, 221–228, 1986 (no month).

W. Hewertson, B. C. Smith and R. A. Shaw, Diphenyl Phosphorochloridite (Diphenyl Monochlorophosphite), Inorganic Syntheses, Chapter 17, 68–71 (no month).

Giovanni Casiraghi, Guiseppe Casnati, Andrea Pochini, Guiseppe Puglia, Rocco Ungaro adn Giovanni Sartori, Uncatalyzed Phenol–Formaldehyde Reactions. A Convenient Synthesis of Substituted 2,2+–Dihydroxydiphenylmethanes, *Communications*, 143–145, Feb. 1981.

MIchael J. Baker, Karl N. Harrison, A. Guy Orpen, Paul G. Pringle and Gordon Shaw, Chelating Diphosphite Complexes of Nickel (0) and Plainum(0): Their Remarkable Stability and Hydrocyanation Activity, *J. Chem. Soc. Chem. Commun.*, 803–804, 1991 (no month).

Michael J. Baker and Paul G. Pringle, Chiral Aryl Diphosphites:a New Class of Ligands for Hydrocyanation Catalysis, *J. Chem. Soc. Chem. Commun.*, 1292–1293, 1991 (no month).

* cited by examiner

POLYMERIC PHOSPHITE COMPOSITION AND HYDROCYANATION OF UNSATURATED ORGANIC COMPOUNDS AND THE ISOMERIZATION OF UNSATURATED NITRILES

FIELD OF THE INVENTION

This invention relates to a polymeric phosphite composition and polymeric phosphite catalyst composition that can be useful for a variety of catalytic processes, to a process for producing the composition, and to a process for using the composition in the hydrocyanation of unsaturated organic compounds and the isomerization of unsaturated nitrites.

BACKGROUND OF THE INVENTION

Phosphorus-based ligands are ubiquitous in catalysis, finding use for a number of commerically important chemical transformations. Phosphorus-based ligands commonly encountered in catalysis include phosphines and phosphites. Monophosphine and monophosphite ligands are compounds which contain a single phosphorus atom which serves as a donor to a transition metal. Bisphosphine, bisphosphite, and bisphosphorus) ligands in general, contain two phosphorus donor atoms and typically form cyclic chelate structures with transition metals.

Two industrially important catalytic reactions using phosphorus ligands of particular importance are olefin hydrocyanation and isomerization of branched nitrites to linear nitrites. Phosphite ligands are particularly good ligands for both reactions. The hydrocyanation of ethylenically unsaturated compounds using transition metal complexes with monodentate phosphite ligands is well documented in the prior art. See for example U.S. Pat. Nos. 3,496,215; 3,631,191; 3655,723; 3,766,237; and 5,543,536. Bidentate phosphite ligands have also been shown to be particularly useful ligands in the hydrocyanation of activated ethylenically unsaturated compounds. See for example, Baker, M. J., and Pringle, P. G., *J. Chem. Soc., Chem. Commun.*, 1292, 1991; Baker et al., *J. Chem. Soc., Chem. Commun.*, 803, 1991; WO 93,03839; U.S. Pat. Nos. 5,512,696; 5,723,641; 5,688,986.

Recovery of the ligand and catalyst is important for a successful process. Typical separation procedures to remove the product(s) from the catalyst and ligand involve extraction with an immiscible solvent or distillation. It is usually difficult to recover the catalyst and ligand quantitatively. For instance, distillation of a volatile product from a non-volatile catalyst results in thermal degradation of the catalyst. Similarly, extraction results in some loss of catalyst into the product phase. For extraction, one would like to be able to tune the solubility of the ligand and catalyst to disfavor solubility in the product phase. These ligands and metals are often very expensive and thus it is important to keep such losses to a minimum for a commercially viable process.

One method to solve the problem of catalyst and product separation is to attach the catalyst to an insoluble support. Examples of this approach have been previously described, and general references on this subject can be found in "Supported Metal Complexes", D. Reidel Publishing, 1985, Acta Polymer., 1996, 47,1; Comprehensive Organometallic Chemistry, Pergarnon Press, 1982, Chapter 55; and Beller, M., Cornils, B., Frohning, C. D., Kohlpaintner, C. W., *Journal of Molecular Catalysis A*, 104, 1995, 17–85 and *Macromol. Symp.* 1994, 80, 241. Specifically, monophosphine and monophosphite ligands attached to solid supports are described in these references. Bisphospine ligands have also been attached to solid supports and used for catalysis, as described in for example U.S. Pat. No. 5,432,289; *J. Mol. Catal. A*, 1996, 112,217; and *J. Chem. Soc., Chem. Commun.*, 1996, 653. The solid support in these prior art examples can be organic, e.g., a polymer resin, or inorganic in nature.

Polymer-supported multidentate phosphorus ligands may be prepared by a variety of methods known in the art. See U.S. Pat. Nos. 4,769,498 and 4,668,651 and published international applications WO9303839 and WO9906146 and EP 0864577 A2 and EP0877029 A2. The prior art discloses side-chain polymers containing multidentate phosphorus ligands as pendant groups.

There is always a need to develop a composition that can be used as or in a catalyst with substantially reduced loss during a catalytic reaction or separation of product from the catalyst. An object of the present invention is, therefore, to provide such a composition and to provide processes for making and for using the composition.

An advantage of the invention composition is that varying the molecular weight and degree of branching can control the solubility of the composition. Another advantage of the invention is that the catalyst produced by the composition can be substantially recovered by filtration. Other objects and advantages of the present invention will become apparent as the invention is more fully disclosed below.

SUMMARY OF THE INVENTION

According to a first embodiment of the invention, a composition is provided. The composition is selected from the group consisting of composition A, composition B, and combinations thereof. Composition A comprises repeat units derived from (1) a carbonyl compound, (2) a monomer, and (3) phosphorochloridite. Composition B comprises repeat units derived from (1) phosphorus trichloride, (2) a polyhydric alcohol, and (3) an aromatic diol. The monomer can be a first polyhydric alcohol, an amine, or combinations thereof.

According to a second embodiment of the invention, a composition that can be used as a catalyst is provided, which comprises (1) composition disclosed in the first embodiment, (2) a Group VIII metal selected from Ni, Co, Pd, and combinations of two or more thereof, and optionally (3) a Lewis acid.

According to a third embodiment of the invention, a process that can be used for producing composition A is provided, which comprises (1) contacting a carbonyl compound with a monomer to produce an intermediate and (2) contacting the intermediate with phosphorochloridite.

According to a fourth embodiment of the invention, a process that can be used for producing composition B is provided, which comprises (1) contacting phosphorus trichloride with a second polyhydric alcohol under a condition sufficient to produce a phosphorus-containing polymer and (2) contacting the phosphorus-containing polymer with an aromatic diol.

According to a fifth embodiment of the invention, a process that can be used for producing composition B is provided, which comprises (1) contacting an N,N-dialkyl dichlorophosphoramidite with a second polyhydric alcohol under a condition sufficient to produce a polymeric phosphoramidite, (2) contacting the polymeric phosphoramidite with an acid, and (3) contacting the resultant polymer with an aromatic diol.

According to a sixth embodiment of the invention, a process is provided. The process comprises contacting, in the presence of a catalyst disclosed in the second embodiment of the invention, an unsaturated organic compound with a hydrogen cyanide-containing fluid under a condition sufficient to produce a nitrile.

According to a seventh embodiment of the invention, a process is provided. The process comprises contacting a nitrile with the catalyst disclosed in the second embodiment of the invention to produce linear 3-alkenenitrile.

DETAILED DESCRIPTION OF THE INVENTION

The polymeric phosphite compositions disclosed in the invention are also referred to as ligands in the application. According to the first embodiment of the invention, composition A comprises, consist essentially of, or consist of repeat units derived from (1) a carbonyl compound, (2) a monomer, and (3) phosphorchmoridite.

The carbonyl compound has the formula of $(R^1O_2C)_m$(OH)—$Ar^1$—(OH)$(CO_2R^1)_m$, $(R^1O_2C)_m$(OH)—$Ar^2$—$A^2$—$Ar^2$—(OH)$(CO_2R^1)_m$, $(R^1O_2C)_m$(OH)—$Ar^2$—$Ar^2$—(OH)$(CO_2R^1)_m$, and combinations of two or more thereof;

The monomer is selected from the group consisting of a first polyhydric alcohol, a diamine, a triamine, a tetra amine, and combinations thereof.

The term "polyhydric alcohol" used herein refers to, unless otherwise indicated, a molecule having two or more hydroxyl groups. Generally a polyhydric alcohol can be selected from the group consisting of dialcohols, trialcohols, tetraalcohols, and combinations of two or more thereof.

The first polyhydric alcohol has the formula selected from the group consisting of $(HO)_m$—$A^1$—$(OH)_m$, $(HO)_m$—$Ar^2$—$A^1$—$Ar^2$—$(OH)_m$, $(HO)_m$—$Ar^2$—(O)—$A^1$—(O)—$Ar^2$—$(OH)_m$, $(HO)_m$—$(A^1$—O)$_p$—$A^1$—$(OH)_m$, (HO—$A^1)_m$(OH)—$Ar^1$—(OH)$(A^1$—OH)$_m$, (HO—$A^1)_m$(OH)—$Ar^2$—$A^2$—$Ar^2$—(OH)$(A^1$—OH)$_m$, (HO—$A^1)_m$(OH)—$Ar^2$—$Ar^2$—(OH)$(A^1$—OH)$_m$, $(HO)_m$—$Ar^2$—(O—$A^1)_p$—O—$Ar^2$—$(OH)_m$, $(OH)_m$—$Ar^2$—$Ar^2$—$(OH)_m$, $(OH)_m$—$Ar^2$—$A^2$—$Ar^2$—$(OH)_m$, $(HO)_m$—$Ar^2$—$A^1$—C(O)—O—$A^1$—O-C(O)—$A^1$—$Ar^2$—$(OH)_m$, (OH)—$Ar^1$—(OH), and combinations of two or more thereof.

Each $Ar^1$ is selected from the group consisting of $C_6$ to $C_{40}$ phenylene group, $C_{12}$ to $C_{40}$ biphenylene group, $C_{10}$ to $C_{40}$ naphthylene group, $C_{20}$ to $C_{40}$ binaphthylene group, and combinations of two or more thereof.

Each $Ar^2$ is independently selected from the group consisting of $C_6$ to $C_{40}$ phenylene group, $C_{10}$ to $C_{40}$ naphthylene group, and combinations thereof.

Each $A^1$ is independently selected from the group consisting of $C_1$ to $C_{12}$ alkylene groups.

Each $A^2$ is independently selected from the group consisting of —C($R^1$)($R^1$)—, —O—, —N($R^1$)—, —S—, —S(O)$_2$—, —S(O)—, and combinations of two or more thereof.

Each $R^1$ is independently selected from the group consisting of hydrogen, $C_1$ to $C_{12}$ alkyl or cycloalkyl group, $C_6$ to $C_{20}$ aryl group, and combinations of two or more thereof.

Each $R^2$ is independently selected from the group consisting of hydrogen, $C_1$ to $C_{12}$ alkyl or cycloalkyl group, acetal having 2 to about 20 carbon atoms, ketal having 2 to about 20 carbon atoms, —O$R^3$, —CO$_2R^3$, $C_6$ to $C_{20}$ aryl group, F, Cl, —NO$_2$, —SO$_3R^3$, —CN, perhaloalkyl having 1 to about 12 carbon atoms, —S(O)$R^3$, —S(O)$_2R^3$, —CHO, —C(O)$R^3$, cyclic ether having 2 to about 10 carbon atoms, —$A^1Z$, and combinations of two or more thereof.

Each Z is —CO$_2R^3$, —CHO, —C(O)$R^3$, —C(O)S$R^3$, —S$R^3$, —C(O)N$R^1R^1$, —OC(O)$R^3$, —OC(O)O$R^3$, —N=C$R^1R^1$, —C($R^1$)=N$R^1$, —C(R)=N—O—$R^1$, —P(O)(O$R^3$)(O$R^3$), —S(O)$_2R^3$, —S(O)$R^3$, —C(O)OC(O)$R^3$, —N$R^3$CO$_2R^3$, —N$R^3$C(O)N$R^1R^1$, F, Cl, —NO$_2$, —SO$_3R^3$, perhaloalkyl having 1 to about 12 carbon atoms, —CN, and combinations of two or more thereof.

Each $R^3$ is independently selected from the group consisting of $C_1$ to $C_{12}$ alkyl or cycloalkyl group, $C_6$ to $C_{20}$ aryl group, and combinations thereof.

Each m is independently a number in the range of from 1 to 2.

Each p is independently a number in the range of from 1 to 10.

The presently preferred carbonyl compounds are diesters, diacids, or combinations thereof.

Examples of suitable diesters or diacids include, but are not limited to those shown below:

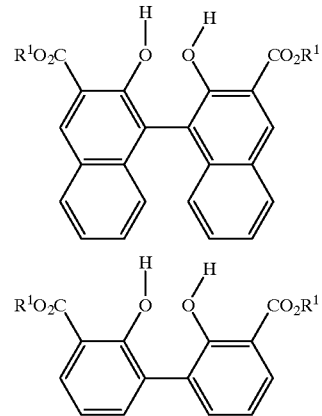

in which each $R^1$ is independently selected from the group consisting of hydrogen, $C_1$ to $C_{12}$ alkyl or cycloalkyl group, $C_6$ to $C_{20}$ aryl group, and combinations of two or more thereof. The other positions on the aromatic rings can also be substituted with an alkyl group, ether group, ester group, or combinations thereof.

Specific examples of suitable diesters or diacids include, but are not limited to, dialkyl 2,2'-dihydroxyl-1,1'-binaphthalene-3,3'-dicarboxylate, dialkyl 2,2'-dihydroxyl-1,1'-biphenyl-3,3'-dicarboxylate, 2,2'-dihydroxy-biphenyl-3,3'-dicarboxylic acid, 2,2'-dihydroxy-1,1'-binaphthyl-3,3'-dicarboxylic acid and combinations of two or more thereof.

The diesters or diacids illustrated above can also be blended with one or more second carbonyl compounds such as, for examples, $(R^1O_2C)_m$—$Ar^1$—$(CO_2R^1)_m$, $(R^1O_2C)_m$—$A^1$—$(CO_2R^1)_m$, $(R^1O_2C)_m$—$Ar^2$—$A^1$—$Ar^2$—$(CO_2R^1)_m$, $(R^1O_2C)_m$—$Ar^2$—(O)—$A^1$—(O)—$Ar^2$—$(CO_2R^1)_m$, $(R^1O_2C)_m$—$(A^1$—O)$_p$—$A^1$—$(CO_2R^1)_m$, and combinations of two or more thereof.

Examples of the second carbonyl compounds that can be blended are terephthalic acid, isophthalic acid, phthalic acid, dimethyl isophthalate, dimethyl phthalate, dimethyl terephthalate.

The first polyhydric alcohol can be aromatic as in a phenol or aliphatic as in an alkyl alcohol and can contain two aromatic alcohols, two aliphatic alcohols, or one of each. The alcohol has the formula disclosed in the above.

Examples of first polyhydric alcohols include, but are not limited to, those illustrated as follows.

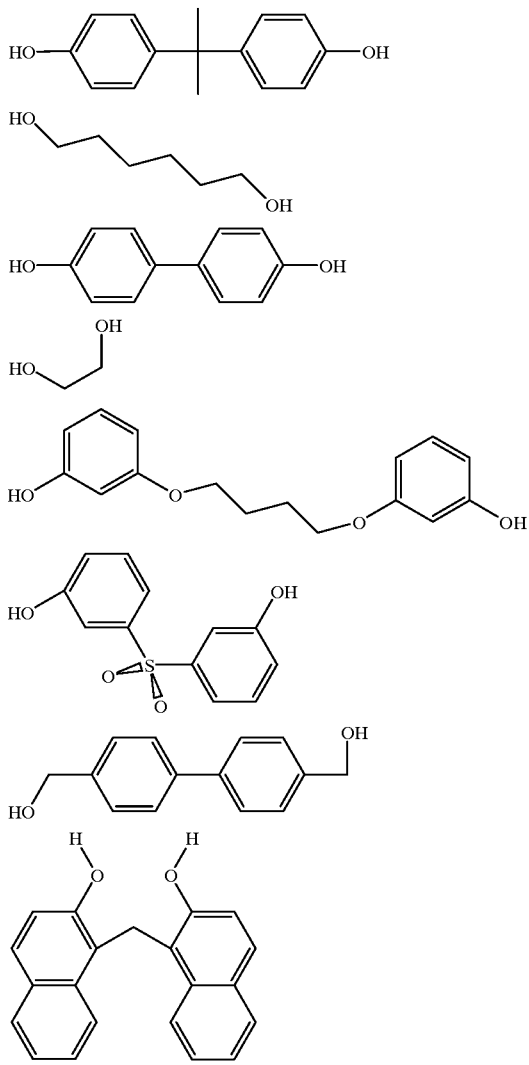

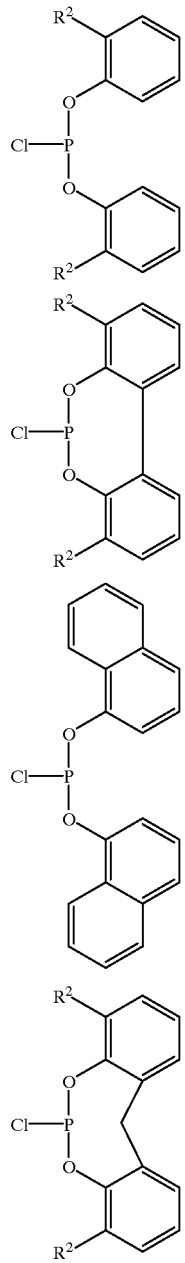

Other examples of polyhydric alcohols are hexa(ethylene glycol), 1,3-propananediol, tetra(ethylene glycol), 1,4-cyclohexanediol, 2,6-dihydroxynaphthalene, or combinations of two or more thereof.

In addition to the polyhydric alcohols shown above, compounds containing three or more hydroxy groups can be used. An example is 1,3,5-benzenetricarboxylic acid.

The monomer can also be an amine selected from the group consisting of diamines, triamines, tetraamines, and combinations of two or more thereof. The amine can be primary or secondary aliphatic amine. Some examples are 1,6-hexanediamine, N,N'-dimethylhexanediamine, 1,4-butanediamine, and combinations of two or more thereof.

The phosphorochloridite has the formula selected from the group consisting of $ClP(O-Ar^2-R^2)_2$, where the $Ar^2$ groups can be unlinked or linked directly or with group $A^2$ and the $R^2$ group is preferably ortho to the oxygen.

Examples of phosphorochloridite include, but are not limited to, those shown below.

in which the other positions on the aromatic ring, i.e., para or meta to the oxygen atom, can also be substituted with alkyl, ether or ester groups, or combinations of two or more thereof.

Composition B comprises repeat units derived from (I) phosphorus trichloride, (2) a second polyhydric alcohol, and (3) an aromatic diol. Phosphorus trichloride ($PCl_3$) can be blended with $Cl_2P(OAr^3)$ or $ClP(OAr^3)_2$ wherein $Ar^3$ is a $C_6$ to $C_{24}$ aryl group in which the aryl group can be substituted with alkyl, aryl, ether, ester, or combinations of two or more thereof.

The location of the OH groups should be placed such that the interaction or reaction with $PCl_3$ will not lead to predominate formation of monodentate phosphites.

Preferred second polyhydric alcohol has the formula selected from the group consisting of $(R^4)(HO)_m-Ar^2-A^1-Ar^2-(OH)_m(R^4)$, $(R^4)(HO)_m-Ar^2-(O-A^1)_p-O-$ $Ar^2$—$(OH)_m(R^4)$, $(R^4)(OH)_m$—$Ar^2$—$Ar^2$—$(OH)_m(R^4)$, $(R^4)(OH)_m$—$Ar^2$—$Ar^2$—$Ar^2$—$(OH)_m(R^4)$, $(R^4)(HO)_m$—$Ar^2$—$A^1$—$C(O)$—$O$—$A^1$—$O$—$C(O)$—$A^1$—$Ar^2$—$(OH)_m$ $(R^4)$, $(R^4)(OH)_m$—$Ar^1$—$(OH)_m(R^4)$, and combinations of two or more thereof; when $R^4$ is not hydrogen and located ortho to the OH group, the other substituent ortho to the OH group is hydrogen.

Each $R^4$ is independently selected from the group consisting of hydrogen, $C_1$ to $C_{12}$ alkyl or cycloalkyl group, acetal having 2 to about 20 carbon atoms, ketal having 2 to about 20 carbon atoms, —$OR^3$, —$CO_2R^3$, $C_6$ to $C_{20}$ aryl group, —$SiR^3$, —$NO_2$, —$SO_3R^3$, —$S(O)R^3$, —$S(O)_2R^3$, —CHO, —$C(O)R^3$, F, Cl, —CN, perhaloalkyl having 1 to about 12 carbon atoms, —$C(O)N(R^3)(R^3)$, —$A^1Z$, and combinations of two or more thereof.

Each Z is —$CO_2R^3$, —CHO, —$C(O)R^3$, —$C(O)SR^3$, —$SR^3$, —$C(O)NR^1R^1$, —$OC(O)R^3$, —$OC(O)OR^3$, —$N=CR^1R^1$, —$C(R^1)=NR^1$, —$C(R^1)N$—$O$—$R^1$, —$P(O)(OR^3)(OR^3)$, —$S(O)_2R^3$, —$S(O)R^3$, —$C(O)OC(O)R^3$, —$NR^3CO_2R^3$, —$NR^3C(O)NR^1R^1$, F, Cl, —$NO_2$, —$SO_3R^3$, —CN, or combinations thereof.

Each $R^3$ is independently selected from the group consisting of $C_1$ to $C_{12}$ alkyl or cycloalkyl group, $C_6$ to $C_{20}$ aryl group, and combinations thereof.

When $R^4$ is independently selected from the group consisting of $C_1$ to $C_{12}$ alkyl group, $C_1$ to $C_{12}$ cycloalkyl group, acetal, ketal, —$OR^3$, —$CO_2R^3$, $C_6$ to $C_{20}$ aryl group, —$SiR^3$, —$SO_3R^3$, —$S(O)R^3$, —$S(O)_2R^3$, —$C(O)N(R^3)(R^3)$, —$A^1CO_2R^3$, or —$A^1OR^3$; the second polyhydric alcohol can be $(OH)_m$—$Ar^1$—$R^4$—$R^4$—$Ar^1(OH)_m$ or $(OH)_mAr^1$—$R^4$—$A^1$—$R^4$—$Ar^1(OH)_m$.

Some representative second polyhydric alcohols include, but are not limited to, those shown in the following formulas.

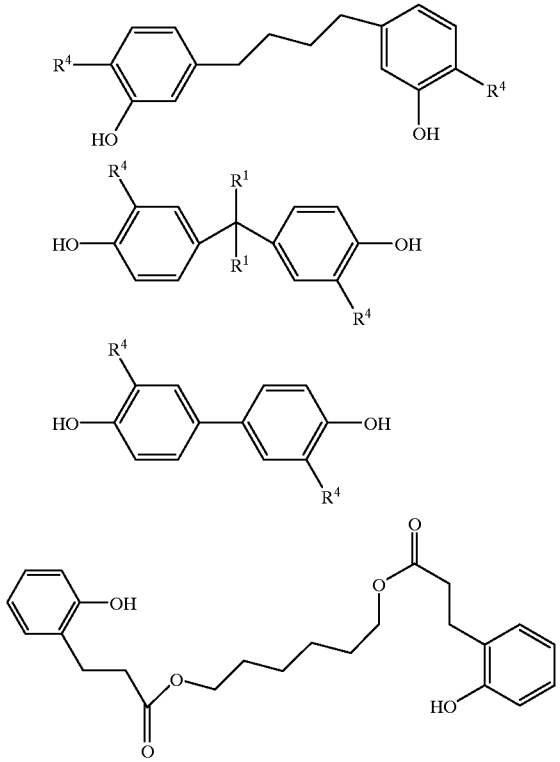

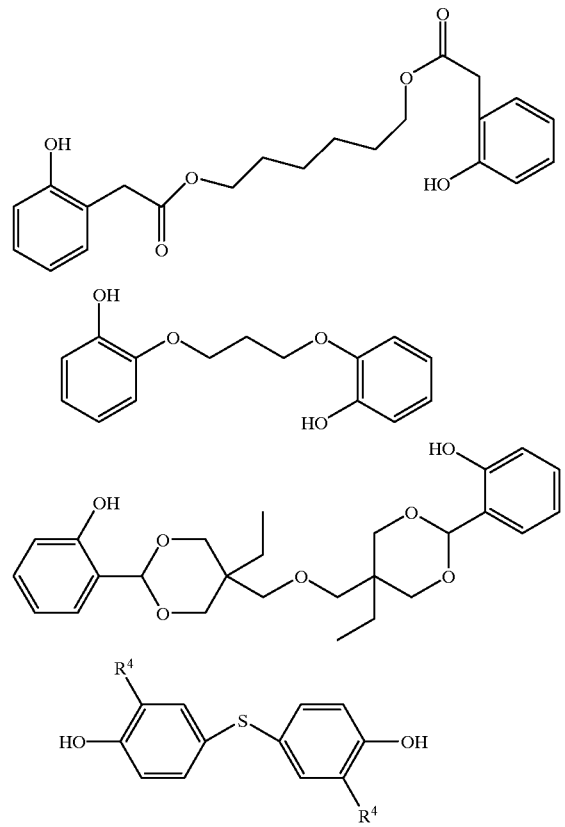

in which $R^1$ and $R^4$ are the same as disclosed above. The other positions on the aromatic ring, preferably para or meta to the oxygen atom, can also be substituted with alkyl, ether or ester groups.

Some representative examples are 6,6'-dihydroxy-4,4,4', 7,7,7'-hexamethyl bis-2,2'-spirochroman, 2,2'-diallylbisphenolA, bisphenol A, 4,4'-(1-methylethylidene) bis(2-(1-methylpropyl)phenol), 4,4'-thiophenol, 4,4'-dihydroxydiphenylsulfone, 4,4'-sulfonylbis(2-methylphenol), bis(4-hydroxy-3-methylphenyl)sulfide, 2,2'-dis(4-hydroxy-3-methylphenyl)propane, 4,4'-ethylidenebis(2,5-dimethylphenol), 4,4'-propylidenebis(2,5-dimethylphenol), 4,4'-benzylidenebis(2,5-dimethylphenol), and 4,4'-ethylidenebis(2-isopropyl-5-methylphenol).

These polyhydric alcohols can be produced by those skilled in the art. For example, the diacetal can be prepared by refluxing di(trimethylolpropane) with salicylaldehyde with oxalic acid as catalyst. For references for preparing acetal from acid catalyzed reaction of an aldehyde and an alcohol, see *Tetrahedron*, 1996, 14599; *Tet. Lett.*, 1989, 1609; *Tetrahedron*, 1990,3315. 1,3-bis(2-hyroxyphenoxy)propane was prepared by a literature procedure, *J. Org. Chem.*, 48, 1983,4867. 4,4'-ethylidenebis(2,5-dimethylphenol); 4,4'-propylidenebis(2,5-dimethylphenol); 4,4'-benzylidenebis(2,5-dimethylphenol); and 4,4'-ethylidenebis(2-isopropyl-5-methylphenol) can be prepared according to *Bull. Chem. Soc. Jpn.*, 62, 3603 (1989).

In addition to the polyhydric alcohols shown above, compounds containing three or more phenolic groups can be used. Representative examples are shown below.

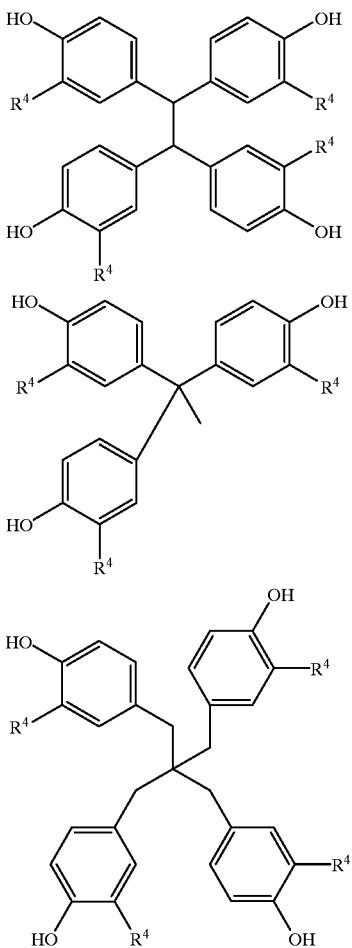

in which $R^4$ are the same as disclosed above. The other positions on the aromatic ring, preferably para or meta to the oxygen atom, can also be substituted with alkyl, ether or ester groups.

The aromatic diol has the following formula

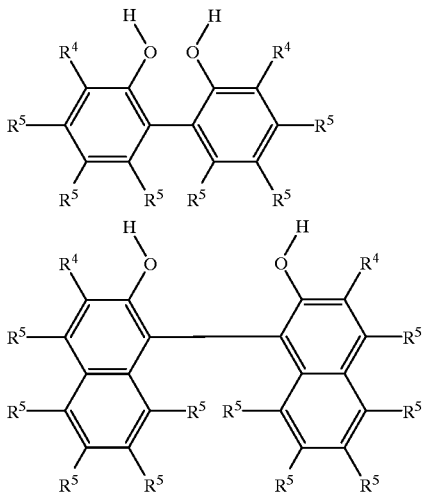

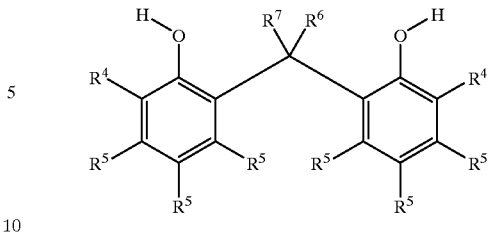

wherein $R^4$ is the same as disclosed above;

each $R^5$ is independently selected from the group consisting of H, F, Cl, $C_1$ to $C_{12}$ alkyl or cycloalkyl, $C_6$ to $C_{20}$ aryl, —$OR^3$, —$CO_2R^3$, —$C(O)R^3$, —CHO, —CN, —$CF_3$, and combinations of two or more thereof;

each $R^6$ independently is H, $C_1$ to $C_{12}$ alkyl or cycloalkyl, $C_6$ to $C_{20}$ aryl, and combinations of two or more thereof; and each $R^7$ independently is H, $C_1$ to $C_{12}$ alkyl or cycloalkyl, $C_6$ to $C_{20}$ aryl, and combinations of two or more thereof.

These aromatic diols can be prepared by any means known to those skilled in the art. Examples include, but are not limited to, 2,2'-dihydroxy-3,3'-dimethoxy-5,5'-dimethyl-1,1'-biphenylene which can be prepared using the procedure described in *Phytochemistry*, 27, 1988, 3008; 2,2'-ethylidenebis(4,6-dimethylphenol) which can be prepared according to *Bull. Chem. Soc. Jpn.*, 1989, 62, 3603; 3,3'-dimethoxy-2,2'-dihydroxy-1,1'-binaphthalene which can be prepared by the procedure of *Recl. Trav. Chim. Pays. Bas.*, 1993, 112, 216; diphenyl 2,2'-dihydroxy-1,1'-binaphthalene-3,3'-dicarboxylate which can be prepared by the procedure described in *Tetrahedron Lett.*, 1990, 413; 3,3',5,5'-tetrmnethyl-2,2'-biphenol and 3,3',4,4',6,6'-hexamethyl-2,2'-biphenol which can be prepared using the procedure described in *J. Org. Chem.*, 1963, 28, 1063; and 3,3'-dimethyl-2,2'-dihydroxydiphenylmethane which can be prepared using the procedure described in *Synthesis*, 1981, 2, 143.

These aromatic diols can be incorporated in a polymer as in the polyester and polyamide described above. These polymers containing the aromatic diols can be used in composition B of the invention.

The solubilities of these composition or polymeric phosphite ligands disclosed above generally depend on the molecular weight of the polymer and degree of branching. For soluble polymeric system, separation can therefore be done by extraction. With insoluble polymeric systems, the catalyst can be placed in fixed beds or separated by filtration from a reaction mixture. Alternatively, the solubility of the polymer can be adjusted to be soluble in the reactants and insoluble in the products. Thus, the reaction can be carried out homogeneously to obtain high conversion. The polymeric catalyst can then be separated by easy means such as decantation or filtration.

According to the second embodiment of the invention, the compositions disclosed above can be combined with a Group VIII metal and, optionally, a Lewis acid to produce a catalyst composition. The term "Group VIII" refers to the ACS version of the Periodic Table of the Elements, 67$^{th}$ edition (1986–1987), CRC Handbook of Chemistry and Physics, Press, Boca Raton, Fla. The term "Group VIII metal" used in the invention can also refer to Group VIII metal compound or Group VIII metal complex.

Generally, a Group VIII compound is combined with a polymer disclosed above to produce a desired catalyst.

Among the Group VIII compounds, a nickel compound, a cobalt compound, or a palladium compound is preferred. A nickel compound is more preferred. A zero-valent nickel compound containing a ligand that can be displaced by the polymer is the most preferred source of Group VIII metal. Zero-valent nickel compounds can be prepared or generated according to means known in the art such as disclosed in U.S. Pat. Nos. 3,496,217; 3,631,191; 3,846,461; 3,847,959 and 3,903,120. Two such preferred zero-valent nickel compounds are $Ni(COD)_2$ (COD is 1,5-cyclooctadiene) and $Ni\{P(O\text{-}o\text{-}C_6H_4CH_3)_3\}_2(C_2H_4)$, both of which are known in the art.

Alternatively, divalent nickel compounds can be combined with a reducing agent, to serve as a source of zero-valent nickel in the reaction. Suitable divalent nickel compounds include compounds of the formula $NiY_2$ where Y is halide, carboxylate, or acetylacetonate. Suitable reducing agents include metal borohydrides, metal aluminum hydrides, metal alkyls, Li, Na, K, or $H_2$. Elemental nickel, preferably nickel powder, when combined with a halogenated catalyst, as described in U.S. Pat. No. 3,903,120, is also a suitable source of zero-valent nickel.

The amount of transition metal can be any amount so long as favorable results can be obtained with respect to catalyst activity and process economy, when used as a catalyst. In general, the molar ratio of phosphorus ligand to transition metal generally can be from about 1:1 to about 100:1, preferably from about 1:1 to about 20:1 (moles phosphorus per mole metal).

All aryl groups, arylene groups, alkyl groups, alkylene groups, esters, ethers, acetals, and ketals disclosed in the invention can be substituted with one or more aryl groups, arylene groups, alkyl groups, alkylene groups, ethers, esters, acetals, and ketals.

The composition of the second embodiment of the invention can further comprise one or more Lewis acid promoters that affect both the activity and the selectivity of the catalyst system. The promoter can be an inorganic or organometallic compound in which the promoter contains at least one element selected from scandium, titanium, vanadium, chromium, manganese, iron, cobalt, copper, zinc, boron, aluminum, yttrium, zirconium, niobium, molybdenum, cadmium, rhenium and tin. Examples include $ZnBr_2$, $ZnI_2$, $ZnCl_2$, $ZnSO_4$, $CuCl_2$, CuCl, $Cu(O_3SCF_3)_2$, $CoCl_2$, $CoI2$, $FeI_2$, $FeCl_3$, $FeCl_2$, $FeCl_2(THF)_2$, $TiCl_4(THF)_2$, $TiCl_4$, $TiCl_3$, $ClTi(OiPr)_3$, $MnCl_2$, $ScCl_3$, $AlCl_3$, $(C_8H_{17})AlCl_2$, $(C_8H_{17})_2AlCl$, $(iso\text{-}C_4H_9)_2AlCl$, $Ph_2AlCl$, $PhAlCl_2$, $ReCl_5$, $ZrCl_4$, $NbCl_5$, $VCl_3$, $CrCl_2$, $MoCl_5$, $YCl_3$, $CdCl_2$, $LaCl_3$, $Er(O_3SCF3)_3$, $Yb(O_2CCF_3)_3$, $SmCl_3$, $B(C_6H_5)_3$, $TaCl_5$. Suitable promoters are fuirther described in U.S. Pat. Nos. 3,496,217; 3,496,218 and 4,774,353. These include metal salts (such as $ZnCl_2$, $CoI_2$, and $SnCl_2$), and organometallic compounds (such as $RAlCl_2$, $R_3SnO_3SCF_3$, and $R_3B$, where R is an alkyl or aryl group). U.S. Pat. No. 4,874,884 describes how synergistic combinations of promoters can be chosen to increase the catalytic activity of the catalyst system. Preferred promoters include $CdCl_2$, $FeCl_2$, $ZnCl_2$, $B(C_6H_5)_3$, and $(C_6H_5)_3SnX$, where $X=CF_3SO_3$, $CH_3C_6H_5SO_3$, or $(C_6H_5)_3BCN$. The mole ratio of promoter to Group VIII metal can be in the range of from about 1:1 to about 1000:1, preferably about 1:16 to about 50:1.

According to the third embodiment of the invention, a process that can be used for producing composition A disclosed above comprises (1) contacting a carbonyl compound with a monomer under a condition sufficient to produce an intermediate and (2) contacting the intermediate with phosphorochloridite under a condition effective to produce the composition disclosed in the first embodiment of the invention.

The definition and scope of the carbonyl compound, monomer, and phosphorochloridite are the same as those disclosed above and, for the interest of brevity, the description of which is omitted herein.

In the first step of the process, a carbonyl compound disclosed above is contacted with a monomer disclosed above to produce an intermediate that can be a polyester or a polyamide. The contacting can be carried out with any molar ratio of the monomer to carbonyl compound so long as the ratio is sufficient to produce the intermediate. The ratio generally can be in the range of from about 0.1:1 to about 10:1, preferably about 0.5:1 to about 5:1, and more preferably about 1:1 to about 2:1. Generally the process can be carried out with either an excess of monomer or equimolar of monomer to carbonyl compound. The ratio of reactive ester and acid to reactive alcohol or amine of 1:1 is most preferred.

Alternatively, the carbonyl compound can be combined with a second or other carbonyl compounds disclosed above. Additional examples of the second carbonyl compounds include, but are not limited to $(R^1O_2C)_m$—$Ar^1$—$(CO_2R^1)_m$, $(R^1O_2C)_m$—$A^1$—$(CO_2R^1)_m$, $(R^1O_2C)_m$—$Ar^2$—$A^1$—$Ar^2$—$(Co_2R^1)_m$, $(R^1O_2C)_m$—$Ar^2$—$(O)$—$A^1$—$(O)$—$Ar^2$—$(CO_2R^1)_m$, $(R^1O_2C)_m$—$(A^1$—$O)_p$—$A^1$—$(CO_2R^1)_m$, and combinations of two or more thereof.

The contacting can be carried out under any condition as long as the condition is sufficient to effect the production of the intermediate. Generally it includes a temperature in the range of from about 100° C. to about 450° C., preferably about 150° C. to about 350° C., and most preferably 180° C. to 270° C., under any pressure that can accommodate the temperature range, and for a sufficient time of about 1 minute to about 24 hours. The contacting can be carried out neat or with an inert solvent such as tetraglyme.

The resulting intermediate can be then contacted with a phosphorochloridite disclosed above to form the polymeric phosphite ligand. The molar ratio of the phosphorochloridite to the alcohol group of the intermediate, can range from about 10:1 to about 0.5:1, preferably about 1:1.

The phosphorochloridite can be prepared by any means known to one skilled in the art. For example, by contacting at a temperature between about −40° C. and 10° C. one molar equivalent of $PCl_3$ with about two molar equivalents of substituted phenol in the absence of an organic base. The resulting solution is then treated with at least two equivalents of a base such as an organic base to produce a phosphorochloridite. When the substituted phenols are replaced with substituted biphenol or substituted alkylidenebisphenol, the phosphorochloridite is similarly prepared from initially mixing one molar equivalent of $PCl_3$ with about one molar equivalent of substituted biphenol or substituted alkylidenebisphenol between about −40° C. and 10° C. in the absence of an organic base. The resulting solution is then treated with at least two equivalents of an organic base to produce a phosphorochloridite.

When preparing the phosphorochloridite in the above manner, it is important to maintain temperature in the −40° C. and 10° C. range during the base addition. The addition of base results in the formation of an insoluble salt formed by neutralizing HCl, the reaction mixture can become a thick slurry. Such a slurry can create problems in achieving good mixing of base which is important in avoiding temperature gradients in the reaction mixture which can decrease yield of the desired product. It is important, therefore, that the reaction be conducted with vigorous stirring or other agitation to allow effective removal of heat from the reaction mixture. Cooling to the required temperature range can be accomplished by well-known techniques in the art.

The phosphorochloridite is reacted with the intermediate polyester or polyamide. If less than three equivalents of the organic base were utilized in preparing the phosphorochloridite, additional organic base is added to bring the total equivalents of organic base utilized in the process to at least three. The contacting can be carried out, if desired, in a solvent such as toluene or tetrhydrofuran under a condition sufficient to effect the production of the composition. The contacting is carried out in the presence of a base. The addition of base results in the formation of a salt formed by neutralizing HCl. Suitable bases are organic amines. Especially preferred are trialkylamines. The most preferred bases are selected from the group consisting of tributylamine, benzyldimethylamine, triethylaruine, diisopropylmethylamine, and combinations of two or more thereof. Such condition can include a temperature in the range of from about −50° C. to about 150° C., preferably about −40° C. to about 100° C., and most preferably, −30° C. to 80° C., under any pressure that can accommodate the temperature range, and for a sufficient time of about 1 minute to about 24 hours.

The base used in preparing the ligands is generally anhydrous and soluble in the reaction medium. Suitable bases are the same as those disclosed above.

The phosphorochloridite can be prepared by other methods known in the art, for example. One method involves treating phenols with $PCl_3$, such as described in *Polymer*, 1992, 33, 161; *Inorg. Syn.* 1996, 8, 68; U.S. Pat. No. 5,210,260; WO9622968 and *Z. Anorg. Allg. Chem.* 1986, 535, 221.

When the phosphorochloridite cannot be prepared in good yield from $PCl_3$, the preferred method involves the treatment of N,N-dialkyl diarylphosphoramidite derivatives with HCl. The N,N-dialkyl diarylphosphoramidite is of the form $(R^{9'})_2NP(aryloXY)_2$ where $R^{9'}$ is a $C_1$ to $C_4$ alkyl group, and can be obtained by reacting phenol or substituted phenol with $(R^{9'})_2NPCl_2$ by methods known in the art, such as disclosed in WO9622968, U.S. Pat. No. 5,710,306, and U.S. Pat. No. 5,821,378. The N,N-dialkyl diarylphosphoramidites can be prepared, for example, as described in *Tet. Lett.*, 1993, 34,6451; *Synthesis*, 1988, 2, 142–144, and *Aust J. Chem.*, 1991, 44, 233.

Non limiting examples of the production of the intermediate, i.e., polyester or polyamide, are shown below.

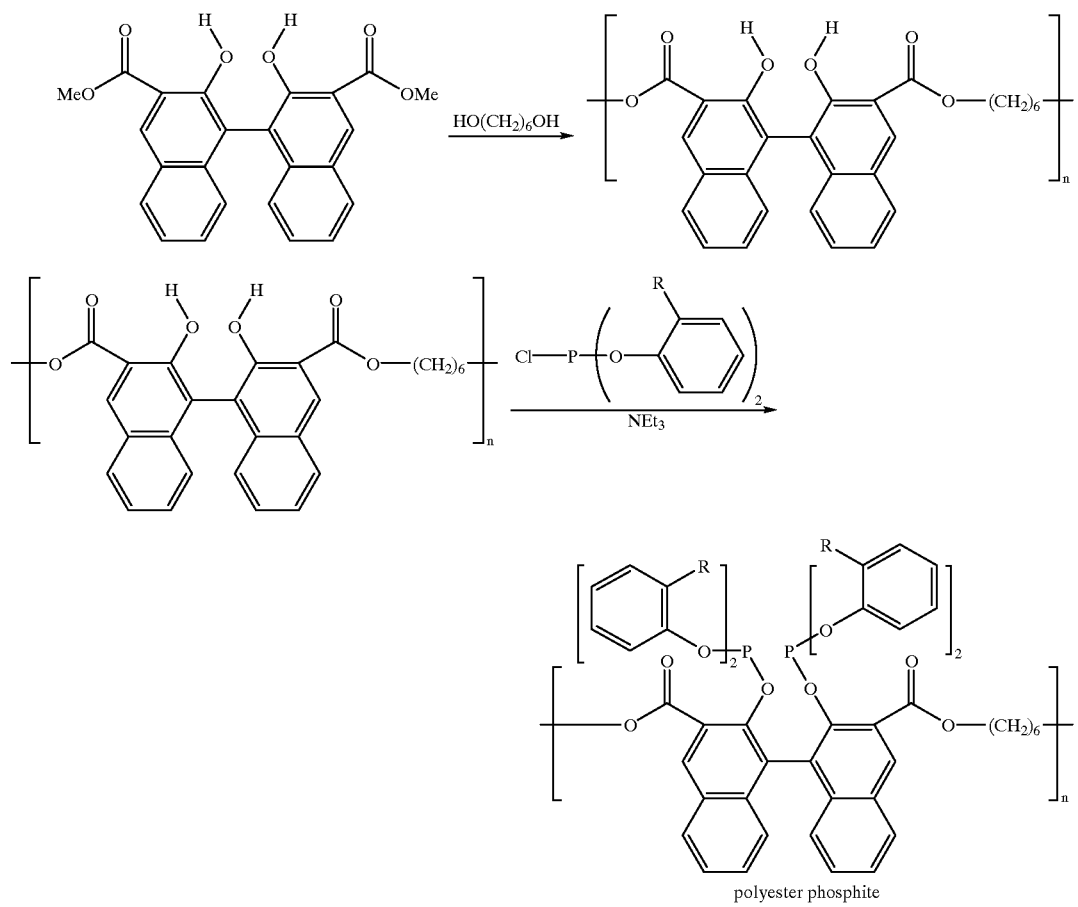

polyester phosphite

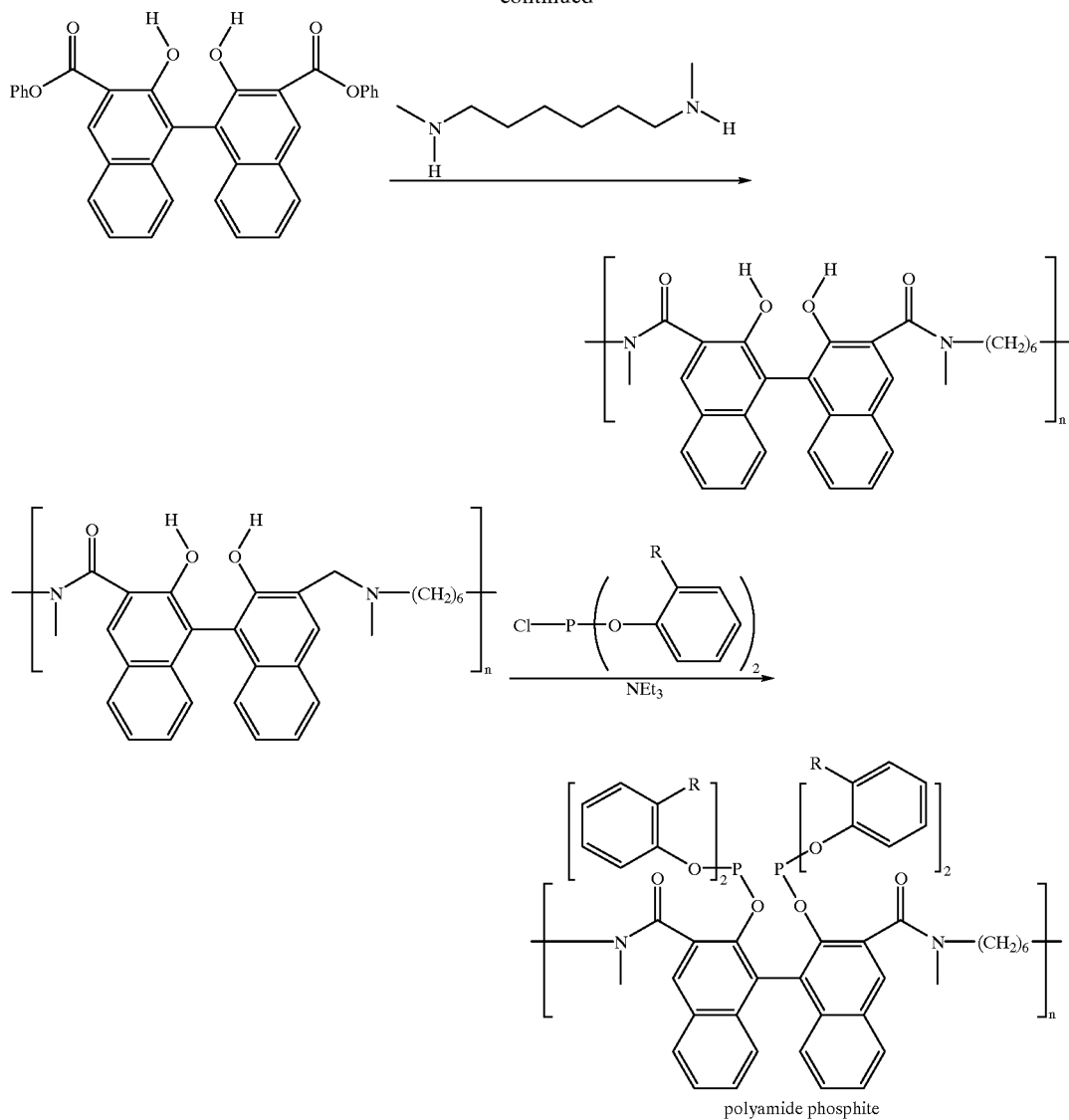

polyamide phosphite

The molecular weight of the polymer depicted above can be adjusted according to need or desire by adjusting the conditions of the process or the moles of carbonyl compound, monomer, or both.

According to the fourth embodiment of the invention, composition B is produced by a process which comprises (1) contacting phosphorus trichloride with a second polyhydric alcohol under a condition sufficient to produce a phosphorus-containing polymer and (2) contacting the phosphorus-containing polymer with an aromatic diol.

The definition and scope of the second polyhydric alcohol and aromatic diol are the same as those disclosed above.

In the first step of the process, a phosphorus-containing polymer (a polumeric phosphorochloridite) with P—Cl bonds is prepared. The polymer contaning phosphorochlo- ridite can be prepared by treating one molar equivalent of $PCl_3$ with about two molar equivalents of reactive hydroxy group of the second polyhydric alcohol in the absence of an organic base. The resulting solution is then treated with at least two equivalents of an organic base to produce a polymer containing phosphorochloridite. Suitable bases are organic amines. Especially preferred are trialkylamines. The most preferred bases are selected from the group consisting of tributylamine, benzyldimethylamine, triethylamine, and diisopropylmethylamine. The condition can include a temperature in the range of from about −40° C. to about 25° C., preferably about −20° C. to about 10° C., under a pressure that can accommodate the temperature, and for a sufficient period of time which can be about 1 minute to about 24 hours. The $PCl_3$ can be blended with $Cl_2P(OAr^3)$ and $ClP(OAr^3)_2$ wherein $Ar^3$ is a $C_6$ to $C_{20}$ aryl group in which the aryl group can be substituted with alkyl, aryl, ether and ester.

The molar ratio of phosphorus trichloride to the alcohol can be any ratio so long as the ratio is sufficient to effect the production of a desired phosphorus-containing polymer. With or without blending with $Cl_2P(OAr^3)$ and $ClP(OAr^3)_2$, generally the molar ratio of $PCl_3$ to reactive —OH groups can range from about 10:1 to about 1:3; preferably 1:2.

According to the fifth embodiment of the invention, the phosphorus-containing polymer can be alternatively produced by contacting an N,N-dialkyl dichlorophosphoramidite with the second polyhydric alcohol to produce a polymeric phosphoramidite followed by contacting the polymeric phosphoramidite with an acid such as, for example, hydrochloric acid to produce the phosphoruscotang polymer such as, for example, polymeric phosphorochloridite. Generally any N, N-dialkyl dichlorophosphoramidite known to one skilled in the art can be used. Each of the alkyl group can contain 1 to about 20, preferably I to about 10 carbon atoms.

Accroding to the fourth or fifth embodiment of the invention, the molecular weight of the phosphoruscontaining polymer can be modified by further contact with an aromatic diol that will react with unreacted P—Cl bonds. The contacting of the phosphorus-containing polymer with the aromatic diol can be carried out under a condition sufficient to produce a polymer containing a phosphite group. The contacting of the polymer containing phosphorochloridite with an aromatic diol is carried out in the presence of an organic base. The addition of base results in the formation of a salt formed by neutralizing HCl. Preferred bases are organic amines. Especially preferred are trialkylamines. The most preferred bases are selected from the group consisting of tributylamine, benzyldimethylamine, triethylamine, and diisopropylmethylamine. Sufficient base is used such that all generated HCl is neutralized. The condition can include a temperature in the range of from about −50° C. to about 150° C., preferably about −40° C. to about 100° C., and most preferably −30° C. to 80° C., under a pressure that can accommodate the temperature, and for a sufficient period of time which can be about 1 minute to about 24 hours.

The molar ratio of aromatic diol to unreacted P—Cl can be any ratio so long as the ratio is sufficient to effect the production of a desired phosphorus-containing polymer. The ratio generally can be in the range of from about 2:1 to about 10:1, preferably about 1:2. It is most preferred that about equal mole of OH groups in the aromatic diol and the P—Cl bonds in the phosphorus-containing polymer be used.

According to the sixth embodiment of the invention, a process that can be used in organic compound conversions is provided. The process can comprise, consist essentially of, or consist of contacting, in the presence of a catalyst composition, an unsaturated organic compound with a hydrogen cyanide-containing fluid under a condition sufficient to produce a nitrile wherein the catalyst composition can be the same as that disclosed in the second embodiment of the invention. The term "fluid" can be gas, liquid, or both. Any fluid containing about 1 to 100% HCN can be used.

Illustrated herein are hydrocyanation and isomerization. Hydrocyanation is a process in which an unsaturated compound such as, for example, an olefin is converted to a nitrile.

The unsaturated organic compound generally has at least one double or triple bond in the molecule and preferably 2 to about 20 carbon atoms. Examples of suitable unsaturated organic compounds include, but are not limited to, linear terminal olefinic hydrocarbons, for example, ethylene, propylene, 1-butene, 1-pentene, 1-hexene, 1-octene, 1-nonene, 1-decene, 1-tetradecene, 1-hexadecene, 1-octadecene, 1-eicosene and 1-dodecene; branched terminal olefinic hydrocarbons, for example, isobutene and 2-methyl-1-butene; linear internal olefinic hydrocarbons, for example, cis- and trans-2-butene, cis- and trans-2-hexene, cis- and trans-2-octene, cis- and trans-3-octene; branched internal olefinic hydrocarbons, for example, 2,3-dimethyl-2-butene, 2-methyl-2-butene and 2-methyl-2-pentene; terminal olefinic hydrocarbons; internal olefinic hydrocarbon mixtures; for example, octenes, prepared by dimerization of butenes; cyclic olefins, for example, cyclohexene, cyclooctene; olefins containing fluorocarbons, for example, 3,3,4,4,5,5,6,6,6-nonafluoro-1-hexene; diolefins, for example, butadiene, 1,3-pentadiene, 1,4-pentadiene, 1,3-hexadiene, 1,4-hexadiene, 1,5-hexadiene, 1,3-cyclohexadiene, 1,4-cyclohexadiene, 1,5-cyclooctadiene and combinations of two or more thereof.

Examples of suitable olefinic compounds also include those substituted with an unsaturated hydrocarbon group, including olefinic compounds containing an aromatic substituent such as styrene, alpha-methylstyrene and allylbenzene.

The unsaturated organic compound can also be substituted with one or more functional groups containing a heteroatom, such as oxygen, sulfur, nitrogen or phosphorus. Examples of these heteroatom-substituted ethylenically unsaturated organic compounds include vinyl methyl ether, methyl oleate, oleyl alcohol, 3-pentenenitrile, 4-pentenenitrile, 3-pentenoic acid, 4-pentenoic acid, methyl 3-pentenoate, acrylonitrile, acrylic acid esters, methyl acrylate, methacrylic acid esters, methyl methacrylate, acrolein, allyl alcohol and combinations of two or more thereof.

The hydrocyanation process can be carried out, for example, by charging a suitable vessel such as a reactor with an unsaturated compound, catalyst composition, and solvent, if any to form a reaction mixture. Hydrogen cyanide can be initially combined with other components to form the mixture. However, it is preferred that HCN is added slowly to the mixture after other components have been combined. Hydrogen cyanide can be delivered as a liquid or as a vapor to the reaction. As an alternative, a cyanohydrin can be used as the source of HCN. See, for example, U.S. Pat. No. 3,655,723.

Another suitable technique is to charge the vessel with the catalyst and the solvent to be used, and feed both the unsaturated compound and the HCN slowly to the reaction mixture.

The molar ratio of unsaturated compound to catalyst can be varied from about 10:1 to about 10000:1. The molar ratio of HCN to catalyst generally is varied from about 10:1 to 100,000:1, preferably 100:1 to 5,000:1, for a batch operation. In a continuous operation, such as when using a fixed bed catalyst type of operation, a higher proportion of catalyst can be used such as 5:1 to 100,000:1, preferably 100:1 to 5,000:1, HCN to catalyst.

Preferably, the reaction mixture is agitated, for example, by stirring or shaking. The reaction product can be recovered by conventional techniques such as, for example, by distillation. The reaction can be run either batchwise or in a continuous manner.

The hydrocyanation can be carried out with or without a solvent. The solvent, if used, can be liquid at the reaction temperature and pressure and inert towards the unsaturated compound and the catalyst. Suitable solvents include hydrocarbons such as benzene, xylene, or combinations thereof; ethers such as tetrahydrofuran (THF); nitrites such as acetonitrile, benzonitrile, adiponitrile, or combinations of two or more thereof. The unsaturated compound to be hydrocyanated can itself serve as the solvent. Hydrocyanation can also be carried out in gas phase.

The exact temperature is dependent to a certain extent on the particular catalyst being used, the particular unsaturated compound being used and the desired rate. Normally, temperatures of from −25° C. to 200° C. can be used, the range of 0° C. to 150° C. being preferred.

Atmospheric pressure can be satisfactory for carrying out the present invention. Generally the pressure of from about 0.05 to about 10 atmospheres (50.6 to 1013 kPa) is preferred. Higher pressures, up to 10,000 kPa or more, can be used, if desired, but any benefit that may be obtained thereby would probably not justify the increased cost of such operations.

The time required can be in the range of from a few seconds to many hours such as 2 seconds to 24 hours, depending on the particular conditions and method of operation.

The preferred unsaturated organic can have the formula of $R^8CH=CH-CH=CR^9$, $CH=CH-(CH_2)_x-R^{10}$, $CH_3-(CH_2)_y-CH=CH-(CH_2)_x-R^{10}$, and combinations of two or more thereof in which $R^8$ and $R^9$ are each independently H, a $C_1$ to $C_3$ alkyl, or combinations thereof; $R^{10}$ is H, CN, $CO_2R^{11}$, perfluoroalkyl group having 1 to about 20 carbon atoms; y is an integer of 0 to 12; x is an integer of 0 to 12 when $R^{10}$ is H, $CO_2R^{11}$ or perfluoroalkyl; x is an integer of 1 to 12 where $R^{10}$ is CN; and $R^{11}$ is $C_1$ to $C_{12}$ alkyl or cycloalkyl group, $C_6$ to $C_{20}$ aryl group, or combinations thereof.

The unsaturated compound can be acyclic, aliphatic, branched, aromatic-containing, or combinations of two or more thereof. Non-limiting examples of monethylenically unsaturated compounds are shown in Formulas I or III, and the corresponding terminal nitrile compounds produced are illustrated by Formulas II or IV, respectively, wherein like reference characters have same meaning.

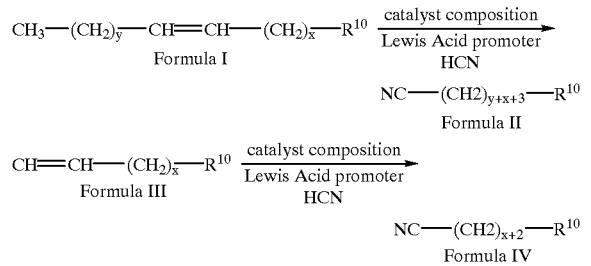

wherein $R^{10}$ is the same as disclosed above.

Examples of the unsaturated compounds include, but are not limited to, unsaturated organic compounds containing from 2 to approximately 30 carbon atoms. 3-Pentenenitrile and 4-pentenenitrile are especially preferred. When nonconjugated acyclic aliphatic monoethylenically unsaturated compounds are used, up to about 10% by weight of the monoethylenically unsaturated compound can be present in the form of a conjugated isomer, which itself may undergo hydrocyanation. For example, when 3-pentenenitrile is used, as much as 10% by weight thereof may be 2-pentenenitrile. (As used herein, the term "pentenenitrile" is intended to be identical with "cyanobutene"). Suitable unsaturated compounds include unsubstituted hydrocarbons as well as hydrocarbons substituted with groups, which do not attack the catalyst, such as cyano. These unsaturated compounds include, but are not limited to, monoethylenically unsaturated compounds containing from 2 to 30 carbons such as ethylene, propylene, butene-1, pentene-2, hexene-2, and combinations of two or more therof; nonconjugated diethylenically unsaturated compounds such as allene, substituted compounds such as 3-pentenenitrile, 4-pentenenitrile, methyl pent-3-enoate, and combinations of two or more therof; and ethylenically unsaturated compounds having perfluoroalkyl substituents such as, for example, $C_zF_{2z+1}$, where z is an integer of up to 20. The monoethylenically unsaturated compounds can also be conjugated to an ester group such as methyl pent-2-enoate.

Examples of preferred unsaturated compounds are linear alkenes, linear alkenenitriles, linear alkenoates, linear alk-2-enoates, perfluoroalkyl ethylenes, and combinations of two or more thereof. Examples of the most preferred unsaturated compounds include 3- and 4-pentenenitrile, alkyl 2-, 3-, and 4-pentenoates, and $C_zF_{2z+1}CH=CH_2$ (where z is 1 to 12), and combinations of two or more thereof.

Examples of the preferred products are terminal alkanenitriles, linear dicyanoalkylenes, linear aliphatic cyanoesters, 3-(perfluoroalkyl)propionitrile, and combinations of two or more therof. Most preferred products are adiponitrile, alkyl 5-cyanovalerate, $C_zF_{2z+1}CH_2CH_2CN$, where z is 1 to 12, and combinations of two or more thereof.

The process of the invention can be carried out in the presence of one or more Lewis acid promoters that affect both the activity and the selectivity of the catalyst system. The promoter is the same as that disclosed above.

Hydrocyanation can also be carried out with a conjugated olefin. With conjugated olefins, a Lewis Acid promoter is generally not present. Examples of conjugated olefins containing from about 4 to about 15, preferably 4 to 10 carbon atoms such as, for example, 1,3-butadiene, cis and trans-2,4-hexadienes, cis and trans-1,3-pentadienes, and combinations of two or more thereof. Butadiene is especially preferred by reason of its commercial importance in the production of adiponitrile.

The following Formulas V and VI illustrate suitable representative starting conjugated olefins; and Formulas VII, VIII, and IX represent the products obtained from 1,3-butadiene and HCN.

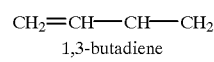
1,3-butadiene

V

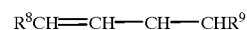

VI wherein each one of $R^8$ and $R^9$, independently, is H or a $C_1$ to $C_3$ alkyl.

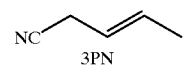
3PN

VII

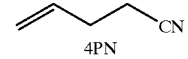
4PN

VIII

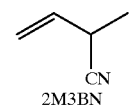
2M3BN

IX in which 3PN denotes 3-pentenenitrile, 4PN is 4-pentenenitrile, and 2M3BN is 2-methyl-3-butenenitrile.

The contacting of a conjugated olefin and a HCN-containing fluid can be carried out the same as that disclosed above.

According to the seventh embodiment of the invention, an isomerization process is provided. The isomerization comprises, consists essentially of, or consist of contacting an alkenyl nitrile with the compositions, which are disclosed in the first and second embodiments of the invention, under a condition sufficient to isomerize the alkenyl nitrile. Lewis Acid is generally not required for the isomerization. Examples of suitable alkenyl nitrites include, but are not limited to, 2-alkyl-3-monoalkenenitriles, 3-alkenenitriles, or combinations thereof. The alkenyl nitrile can be produced by the hydrocyanation process disclosed above or a continuous process of the hydrocyanation process without isolating the alkenyl nitrile. The isomerization can be carried out substantially similar conditions as disclosed above in the hydrocyanation process.

For example, 2-alkyl-3-monoalkenenitrile used as the starting material in the isomerization of the invention can result from the hydrocyanation of a diolefin disclosed above or can come from any other available sources. The olefinic double bond in the 2-alkyl-3-monoalkenenitriles used as the starting materials in the isomerization of this invention cannot be conjugated to the triple bond of the cyano group. Suitable starting 2-alkyl-3-monoalkenenitriles can also carry groups that do not attack the catalyst, for example, another cyano group. Preferably, the starting 2-alkyl-3-monoalkenenitriles contain from 5 to 8 carbon atoms, excluding any additional substitution. 2-Methyl-3-butenenitrile is especially important in the production of adiponitrile. Other representative nitrites include 2-ethyl-3-butenenitrile and 2-propyl-3-butenenitrile.

When the starting nitrile is 2-methyl-3-butenenitrile, the isomerization products are those shown in Formulas VII and VIII.

The isomerization process of this invention can be carried out, for example, at atmospheric pressure and at any temperature in the range of 10–200° C., preferably in the range of 60–150° C. The pressure is not critical, however, and can be above or below atmospheric pressure if desired. Any of the conventional batch or continuous flow procedures may be used either in the liquid phase or in the vapor phase (with respect to the relatively volatile 2-methyl-3-butenenitrile reactant and linear pentenenitrile products). The reactor may be of any mechanically and chemically resistant material, and is usually of glass or an inert metal or alloy, e.g., nickel, copper, silver, gold, platinum, stainless steel, Monel®, Hastelloy®, etc.

The process can be carried out in the absence or in the presence of a solvent or diluent Any solvent or diluent that is inert to or nondestructive of the catalyst can be used, however. Suitable solvents include, but are not limited to, aliphatic or aromatic hydrocarbons (hexane, cyclohexane, benzene), ethers (diethyl ether, tetrahydrofuran, dioxane, glycol dimethyl ether, anisole), esters (ethyl acetate, methyl benzoate, THF), nitrites (acetonitrile, benzonitrile), or combinations of two or more thereof.

A nonoxidizing environment is desirable in order to retard oxidative deactivation of the catalyst Accordingly, an inert atmosphere, e.g., nitrogen, is preferably used, although air can be used if desired at the expense of loss of a proportion of the catalyst through oxidation.

The nickel complex is essentially nonvolatile, whereas the 2-methyl-3-butenenitrile reactant and the linear pentenenitrile products are relatively volatile. Accordingly, in a continuous flow procedure, the catalyst can be a component of the flowing system in a completely liquid-phase operation. It can also be in a mobile nonflowing liquid state in a semi-vapor phase operation, or it may be in a fixed-bed state in a conventional flowing vapor-phase operation.

The time required for the isomerization process to obtain a practical level of conversion of, for example, 2-alkyl-3-monoalkenenitrile to linear alkenenitrile is dependent upon the temperature of reaction, i.e., operation at lower temperature generally requires a longer time than operation at a higher temperature. A practical reaction time can be in the range of a few seconds to many hours such as 2 seconds to about 24 hours, depending on the particular conditions and method of operation.

The molar ratio of 2-alkyl-3-monoalkenenitrile to catalyst is generally greater than 1:1, usually in the range from about 5:1 to 20,000:1, preferably 100:1 to 5,000:1, for a batch or continuous operation.

EXAMPLES

The following non-limiting, representative examples illustrate the process and catalyst compositions of this invention. All parts, proportions, and percentages are by weight, unless otherwise indicated. In each example, the following procedure was used unless otherwise noted.

Example 1

Preparation of Polyester Derived Polymeric Phosphite Containing o-cresol as Terminal Groups
Preparation of Polyester A catalyst solution was prepared by warming 0.1 g Fascat 4102 (butyltin tris(2-ethylhexanoate)) and 10 g of 1,6-hexanediol on the hot plate in a small vial with a small magnet. The solution was kept warm. A mixture containing 5 g of dimethyl 2,2'-dihydroxy-1,1'-binaphthalene-3,3'-dicarboxylate (0.0123 mmoles; reference for preparation; see *J. Am. Chem. Soc.*, 1954, 76,296 and *Tetrahedron Lett.*, 1990, 413), 2.6 g of 1,6-hexanediol and 1.75 g of warm catalyst solution was placed in a 25 ml microware 1-neck rb (round bottom) flask connected to a distillation head and receiver with a pre-calibrated heating mantle while stirring magnetically until methanol started to distill off (the temperature was about 180° C. at which temperature the dimethyl 2,2'-dihydroxy-1,1'-binaphthalene-3,3'-dicarboxylate had all dissolved). The temperature was then increased until the 1,6-hexanediol started to reflux in the top of the flask (220° C.). The mixture was allowed to reflux for about an hour and then house vacuum was gradually applied. Full pump vacuum was then applied to distill off the excess 1,6-hexanediol. The pressure was lowered very slowly to 4 mm Hg over the next two hours in order to avoid bumping. The reaction mixture was then polymerized at 270° C. for 2 hours while distilling off most of the 1,6-hexanediol. After cooling, the reaction mixture was refluxed with 25 ml of acetone for three hours and then cooled and filtered. NMR indicated degree of polymerization to be 6.
Preparation of Polyester 1

The polymer prepared in example 1 was added to the phosphorochloridite of o-cresol in the presence of triethylamine in toluene. The mixture was stirred overnight and then filtered. The solvent was removed to give the desired polymer. $^{31}$P{H} (121.4 MHz, CDCl$_3$): 132.13, 131.7, 130.6, 130.5, 130.4, 127.6 ppm.

Example 1A

Hydrocyanation and Isomerization Results with Polyester 1

Preparation of catalyst: A catalyst solution was prepared by adding 0.039 g of Ni(COD)$_2$ (0.14 mmol)to 0.397 g of polyester1 (0.42 mmol of bidentate phosphite equivalents; the unit formula weight of the polymers were determined based on the expected formula) in 4.568 g toluene.

Hydrocyanation of butadiene: 74 µl of the above catalyst solution (0.0019 mmol Ni) were added to 2 reaction vials fitted with septum caps. The vials were cooled to −20° C. and 120 µl of a solution of HCN in valeronitrile (0.830 mmol HCN) and 280 µl of a solution of butadiene (BD) in toluene (0.925 mmol BD) were added to each vial. The vials were sealed and placed in a hot-block reactor set at 80° C.

Samples were removed after 1.5 and 3 hours and quenched by cooling to −20° C. The reaction mixtures were then diluted in ethyl ether and the product distribution analyzed by GC against valeronitrile as an internal standard. Analysis showed that 67.5 and 68.7% of the starting HCN had been converted to useful pentenenitriles (the 3-pentenenitrile to 2-methyl-3-butenenitrile ratio was 1.1) after 1.5 and 3 hours respectively.

Isomerization of 2-methyl-3-butene nitrile (2M3BA): 82 μl of the above catalyst solution (0.0021 mmol Ni) were added to 2 reaction vials fitted with septum caps. 130 μl of a cold solution containing 2M3BN and valeronitrile (0.930 mmol 2M3BN) were added to each vial. The vials were sealed and placed in a hot block reactor set at 125° C. Samples were removed after 1.5 and 3.0 hrs, cooled and diluted in ethyl ether. The product distribution was analyzed by GC using valeronitrile as an internal standard. The 3PN/2M3BN ratio was 3.88 after 1.5 hrs and 5.50 after 3 hours.

Hydrocyanation of 3,4 Pentenenitrile (3,4 PN): 116 μl of the above catalyst solution (0.0030 mmol Ni), and 13 μl of a solution of $ZnCl_2$ in 3PN (0.0067 mmol $ZnCl_2$) were added to a vial fitted with a septum cap. The vial was cooled to −20° C. and 125 μl of a solution of HCN, t-3PN, and 2-ethoxyethyl ether (0.396 mmol HCN, 0.99 mmol t-3PN) was added. The vial was sealed and set aside for 24 hours at room temperature. The reaction mixture was diluted with ethyl ether and the product distribution analyzed by GC using 2-ethoxyethyl ether as an internal standard. Analysis showed that 35.3% of the starting pentenenitriles had been converted to dinitrile product (88.1% yield based on HCN.) The selectivity to the linear ADN isomer was 92.7%.

Example 2

Preparation of Polyester 2

Same procedure as with example 1 except the phosphorochloridite of the acetal containing phenol derived from the reaction of salicylaldehyde and 1,3-propanediol was used.

Example 2A

Hydrocyanation and Isomerization with Polyester 2

The same procedure as in example 1A but with polyester 2 was used.

Hydrocyanation of butadiene: Analysis showed that 54% of the starting HCN had been converted to useful pentenenitriles after 3 hours (the 3PN/2M3BN ratio was 0.56).

Isomerization of 2-methyl-3-butene nitrile: Analysis showed that the 3PN/2M3BN ratio was 16.2 after 3 hours.

Hydrocyanation of 3,4 Pentenenitrile: Analysis showed that 11.4% of the starting pentenenitriles had been converted to dinitrile product (28.5% yield based on HCN.) The selectivity to the linear ADN isomer was 92.4%.

Example 3

Preparation of Polyamide 1
Preparation of Polyamide

1. A 75-cc stainless steel autoclave equipped with a glass sleeve was charged with 3.05 g (21 mmol) N,N'-dimethyl-1,6-hexanediamine, 30 g deionized water, and 10.9 g (21 mmol) diphenyl 2,2'-dihydroxy-1,1'-binaphthalene-3,3'-dicarboxylate. The reactor contents were purged with nitrogen.

2. The reactor was set to vent at 250 psig. The reactor was heated to 200° C. over forty minutes, then heated to 240° C. over sixty minutes. At 100 minutes, the reactor pressure was reduced to atmospheric pressure over 60 minutes while temperature was increased to 275° C. The reactor was held at one atmosphere steam and 275° C. for forty-five minutes.

3. After cooling, the solid product, 10 g, was removed
Preparation of Polyamide 1

The polyamide from above was reacted with the phosphorochloridite of o-cresol in toluene with triethylamine as the base. The mixture was filtered and the solvent removed by rotary evaporation to give the desired polymeric phosphite. The polymer was soluble in chloroform. $^{31}P\{H\}$ (202 MHz, $CDCl_3$): major resonance at 132.1 ppm.

Example 3A

Hydrocyanation with Polyamide 1

This example was carried out using the same procedures as in example 1A but with polyamide 1.

Hydrocyanation of butadiene: Analysis showed that 29% of the starting HCN had been converted to useful pentenenitriles after 3 hrs (the 3PN/2M3BN ratio was 0.73).

Example 4

Branched Polymer 1
Preparation of Diol

In a 100 ml rb flask was charged 16.447 g (0.099 mole) of 3-(2-hydroxyphenyl)propionic acid, 20 mg of Fascat 4102 and 5.840 g (0.049 mole) of 1,6-hexanediol. The mixture was heated at 170–225° C. for three hours to remove water. The mixture was then heated at 275° C. for 70 minutes and then the temperature was lowered to 200° C. House vacuum was applied and the temperature increased to 260° C. for 20 minutes. The mixture was flash column chromatographed using 20% EtOAc(ethyl acetate) in hexane as eluent. Thus obtained was 9.95 g of the desired product as an oil. $^1H$ nmr (500 Mhz, $CDCl_3$): 7.2 (br s, 2H), 6.95 (m, 4H), 6.7 (m, 4H), 3.9 (t, 4H), 2.85 (t, 4H), 2.6 (t, 4H), 1.45 (m, 4H), 1.2 (m, 4H).
Preparation of Branched Polymer 1

Under an inert atmosphere, a 100 ml rb flask with a magnetic stirrer was charged with 0.900 g of phosphorus trichloride, 2.716 g of the diol from above and 10 ml of toluene. The mixture was cooled at −30° C. and a pre-cooled solution of tri-n-butylamine in 20 ml (−30° C.) of toluene was added over a fifteen minute period. $^{31}P\{H\}$ (202 Mhz) of the reaction mixture indicated a major resonance at 162 ppm. To this mixture was added 1.725 g of diphenyl-2,2'-dihydroxy-1,1'-binaphthalene-3,3'-dicarboxylate and additional 2.0 g of tri-n-butylamine. The gel was allowed to stand overnight. Some solvent was removed and acetonitrile was added. The yellow solid (5.610 g) was collected. Solid state $^{31}P$ magic-angle-spinning NMR (121.5Mhz): 143 and 125 ppm.

Example 4A

Hydrocyanation and Isomerization with Branched Polymer 1

Preparation of catalyst. 0.059 g of branched polymer 1 was weighed into each of 3 reaction vials equipped with septun caps. 200 μl of THF were added to each vial and the sample shaken. 320 μl of a freshly made solution containing 0.015 mmol $Ni(COD)_2$ in toluene were added to each vial.

Hydrocyanation of butadiene: One of the catalyst samples prepared above was cooled to −20° C. and 280 μl of a solution of butadiene in toluene (0.925 mmol BD) and 120 μL of a solution of HCN in valeronitrile (0.830 mmol HCN) were added to the vial. The vial was sealed and heated at 80° C. for 3 hours. After a quench by cooling to −20° C., the reaction mixture was then diluted in ethylether and the product distribution analyzed by GC against valeronitrile as an internal standard. Analysis showed that 71.7% of the starting HCN had been converted to useful pentenenitriles (ratio of 3PN/2M3BN was 1.36) after 3 hours.

Isomerization of 2-methyl-3-butene nitrile (2M3BN): 130 μl of a cold solution containing 2M3BN and valeronitrile (0.930 mmol 2M3BN) were added to one of the catalyst samples prepared above. The vial was sealed and heated at 125° C. for 3.0 hours. The reaction mixture was then cooled and diluted in ethyl ether. The product distribution was analyzed by GC using valeronitrile as an internal standard. The 3PN/2M3BN ratio was 0.47 after 3 hrs.

Hydrocyanation of 3,4 Pentenenitrile (3,4 PN): One of the catalyst samples prepared above was cooled to −20° C. and 125 μl of a solution of HCN, t-3PN, and 2-ethoxyethyl ether (0.396 mmol HCN, 0.99 mmol t-3PN) was added. 13 μl of a solution of $ZnCl_2$ in 3PN (0.0067 mmol $ZnCl_2$) were added to the vial. The vial was sealed and set aside for 24 hours at room temperature. The reaction mixture was diluted with ethyl ether and the product distribution analyzed by GC using 2-ethoxyethyl ether as an internal standard. Analysis showed that 23.4% of the starting pentenenitriles had been converted to dinitrile product (64.6% yield based on HCN.) The selectivity to the linear ADN isomer was 91.8%.

Example 5

Preparation of Branched Polymer 2

Under an inert atmosphere, a 250 ml rb flask with a magnetic stirrer was charged with 0.412 g of phosphorus trichloride, 1.105 g of 6,6'-dihydroxy-4,4,4',7,7,7'-hexamethyl bis-2,2-spirochroman in 20 THF and 20 ml of toluene. The mixture was cooled to −30° C. and a pre-cooled solution (−30° C.) of triethylamine (0.800 g) in 20 ml of toluene. The slurry was stirred for 1.5 hours. $^{31}P\{H\}$ (202 MHz) nmr of the reaction mixture indicated a major resonance at 161.8 and 161.7 ppm. To this mixture was added 0.790 g of diphenyl-2,2'-dihydroxy-1,1'-binaphthalene-3,3'-dicarboxylate and additional 0.700 g of triethylamine. The mixture was stirred overnight and then filtered, washed with tetrahydrofiiran. The solvent was removed by rotary evaporation to give 2.124 g of yellow solid. $^{31}P\{H\}$ (202.4 MHz, $CDCl_3$): major peak at 133.0 ppm.

Example 5A

Hydrocyanation and Isomerization Results with Branched Polymer 2

Preparation of catalyst: 0.056 g of branched polymer 2 was weighed into each of 3 reaction vials equipped with septum caps. 200 μl of THF were added to each vial and the sample shaken. 320 μl of a freshly made solution of 39 mg Ni(COD)$_2$ in 2.79 g toluene (0.015 mmol Ni) were added to each vial.

Hyarocyanation of butadiene: One of the catalyst samples prepared above was cooled to −20° C. and 280 μl of a solution of butadiene in toluene (0.925 mmol BD) and 120 μl of a solution of HCN in valeronitrile (0.830 mmol HCN) were added to the vial. The vial was sealed and placed in a hot-block reactor set at 80° C. The sample was removed after 3 hours and quenched by cooling to −20° C. The reaction mixture was then diluted in ethylether and the product distribution analyzed by GC against valeronitrile as an internal standard. Analysis showed that 84.8% of the starting HCN had been converted to useful pentenenitriles (ratio of 3PN/2M3BN was 0.51) after 3 hours.

Isomerization of 2-methyl-3-butene nitrile (2M3BN): 130 μl of a cold solution containing 2M3BN and valeronitrile (0.930 mmol 2M3BN) were added to one of the catalyst samples prepared above. The vial was sealed and placed in a hot block reactor set at 125° C. The sample was removed after 3.0 hours, cooled and diluted in ethyl ether. The product distribution was analyzed by GC using valeronitrile as an internal standard. The 3PN/2M3BN ratio was 0.8 after 3 hrs.

Hydrocyanation of 3,4 Pentenenitrile (3,4 PN): One of that catalyst samples prepared above was cooled to −20° C. and 125 μl of a solution of HCN, t-3PN, and 2-ethoxyethyl ether (0.396 mmol HCN, 0.99 mmol t-3PN) was added. 13 μL of a solution of $ZnCl_2$ in 3PN (0.0067 mmol $ZnCl_2$) were added to the vial. The vial was sealed and set aside for 24 hours at room temperature. The reaction mixture was diluted with ethyl ether and the product distribution analyzed by GC using 2-ethoxyethyl ether as an internal standard. Analysis showed that 1.8% of the starting pentenenitriles had been converted to dinitrile product (5.0% yield based on HCN). The selectivity to the linear ADN isomer was 90.0%.

Example 6

Preparation of Branched Polymer 3

Under an inert atmosphere, a 250 ml rb flask with a magnetic stirrer was charged with 0.412 g of phosphorus trichloride, 0.769 g of 2,2'-bis(4-hydroxy-3-methylphenyl) propane in 20 ml THF and 20 ml of toluene. The mixture was cooled to −30° C. and a pre-cooled solution (−30° C.) of triethylamine (0.800 g) in 20 ml of toluene was added. The slurry was stirred for 3 hours and then cooled to −30° C. To this mixture was added 0.406 g of 3,3',4,4',6,6'-hexamethyl-2,2'-biphenol (prepared by coupling of 2,3,5-trimethylphenol using the literature procedure for 3,3',5,5'-tetramethyl-2,2'-biphenol: W.W. Kaeding, *J. Org. Chem.*, 1963, 28, 1063) and additional 0.700 g of triethylamine with 10 ml of THF. The mixture was stirred overnight and then filtered, washed with tetrahydrofuran. The solvent was removed by rotary evaporation to give 1.449 g of an off white solid. $^{31}P\{H\}$ nmr (202.4 MHz, $CDCl_3$): major peak at 136.05, and broad peak at 134.76 ppm.

Hydrocyantion and Isomerization using Branched Polymer 3

Used the same procedures as in example 1A but with branched polymer 3.

Hydrocyanation ofbutadiene: Analysis showed that 81.3% of the starting HCN had been converted to useful pentenenitriles after 3 hrs (the 3PN/2M3BN ratio was 14.3).

Isomerization of 2-methyl-3-butene nitrile): Analysis showed that the 3PN/2M3BN ratio was 19.2 after 3 hours.

Hydrocyanation of 3,4 Pentenenitrile: Analysis showed that 25.4% of the starting pentenenitriles had been converted to dinitrile product (63.5% yield based on HCN). The selectivity to the linear ADN isomer was 94.0%.

In the representative examples in Table 1 the polymeric phosphite was prepared from one of the polyhydeic alcohol 1-8 and one of aromatic diol A-E. Examples 7–9 and 13–14 illustrate the importance of control of polymer morphology on catalyst activity and selectivity.

Polyhydric Alcohol:
1
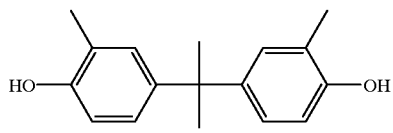
2
3
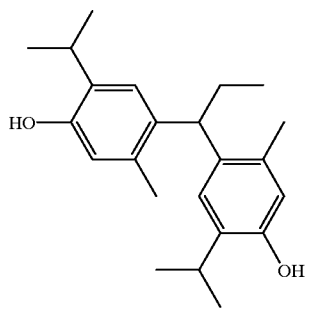
4
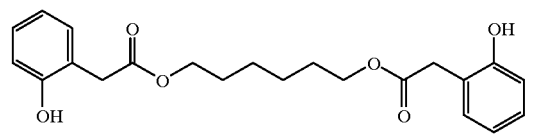
5
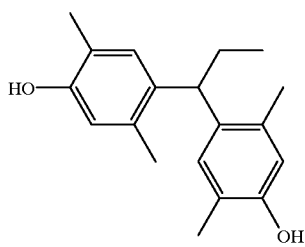
6
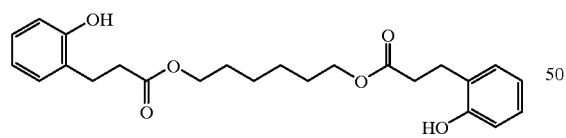
7
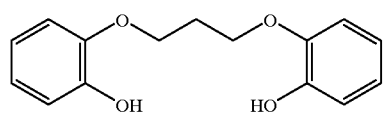
8
9
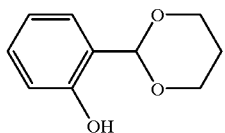
Aromatic Diols:
A
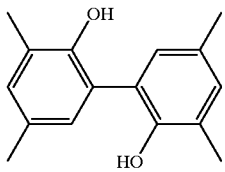
B
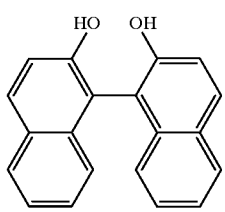
C
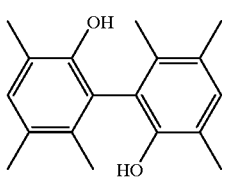
D
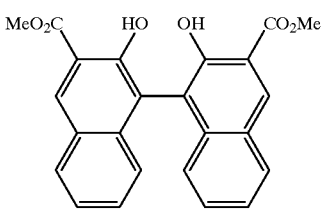
E
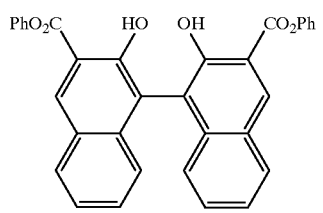
F
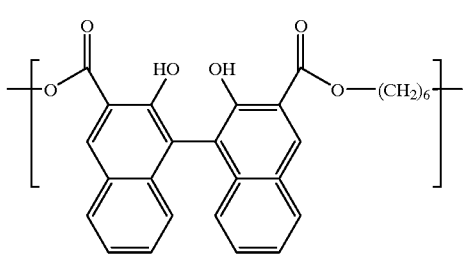

TABLE 1

Selectivity and activity of several catalysts comprising polymeric phosphite ligands in the hydrocyanation of butadiene and t-3 pentenenitrile, and the isomerization of 2-methyl-3-butenenitrile

| Example | diol | bridge | BD hydrocyanation yield[a] | 3PN/2M3 | 3PN hydrocyanation yield[a] | Selectivity to ADN | Isomerization 3PN/2M3BN |
|---|---|---|---|---|---|---|---|
| 7[b,d] | 1 | A | 29.5 | 0.9 | 66.5 | 88.8 | 11.66 |
| 8[c,e] | 1 | A | 76.9 | 1.9 | 59.0 | 88.6 | 11.69 |
| 9[c,f] | 1 | A | 77.1 | 8.2 | 63.0 | 89.7 | 26.39 |
| 10[c] | 1 | B | 32.0 | 0.7 | 50.2 | 80.7 | 5.28 |
| 11[c] | 1 | D | 68.2 | 1.5 | 50.8 | 87.1 | 17.17 |
| 12[c,g] | 1 | E | 74.0 | 0.8 | 49.5 | 83.6 | 1.57 |
| 13[c,h] | 1 | E | 70.1 | 1.0 | 67.0 | 88.4 | 2.82 |
| 14[c] | 2 | C | 83.5 | 1.2 | 43.5 | 78.7 | 17.81 |
| 15[c] | 3 | A | 69.9 | 31.5 | 59.5 | 92.8 | 21.01 |
| 16[c] | 5 | C | 74.4 | 18.2 | 62.5 | 90.1 | 21.93 |
| 17[c] | 4 | A | 73.8 | 2.5 | 38.5 | 94.4 | 1.51 |
| 18[c] | 6 | A | 73.6 | 19.5 | 63.3 | 91.9 | 18.72 |
| 19[c] | 7 | A | 86.0 | 2.7 | 50.8 | 95.5 | 15.47 |
| 20[c] | 7 | C | 86.5 | 1.3 | 12.0 | 94.7 | 16.81 |
| 21[c] | 8 | D | 84.5 | 2.5 | 31.25 | 89.9 | 18.28 |

[a] Yield in % based on HCN.
[b] Hydrocyanation and isomerization procedure analogous to that in Example 1A.
[c] Hydrocyanation and isomerization procedure analogous to that in Example 4A.
[d] 770 mg 1 were added to 412 mg $PCl_3$ in a mixture of 30 ml toluene and 20 ml THF at −30° C. 800 mg $NEt_3$ in 20 ml toluene at −30° C. were added. Stirred 60 hrs. Added 363 mg A and 700 mg $NEt_3$ in 10 ml THF. Product was isolated by filtration.
[e] 650 mg $NEt_3$ in 5 ml THF were added to 412 mg $PCl_3$ and 769 mg 1 in 15 ml THF at −30° C. over a period of 10 minutes. 3 ml THF were added and the slurry cooled in a −30° C. freezer. 363 mg A and 650 mg $NEt_3$ were added, resulting in a gel. 15 ml THF were added and the solution filtered. Solids were washed with hot $H_2O$, then with acetone, $CH_3CN$ and THF.
[f] 650 mg $NEt_3$ in 15 ml THF were cooled to −30° C. and added to 412 mg $PCl_3$ and 769 mg 1 in 20 ml of THF at −30° C. The slurry was cooled after the addition. 363 mg A and 650 mg $NEt_3$ were added. The solution was filtered and solids washed with THF. The polymer was THF soluble.
[g] 412 mg $PCl_3$ and 769 mg 1 in 20 ml toluene and 20 ml THF were cooled to −30° C. in a freezer. 800 mg $NEt_3$ in 20 ml toluene were added and the mixture cooled to −30° C. 790 mg E and 700 mg $NEt_3$ were added. The mixture was filtered, washed with THF and the product recovered by removal of the solvent.
[h] 1.679 g 1 was dissolved in 17 g toluene. 900 mg of $PCl_3$ were added. 5 g $N(nBu)_3$ in 8.7 g toluene were cooled to −30° C. and added to the mixture. 1.727 g E, 2.6 g $N(nBu)_3$, and 20 ml toluene were added and the mixture stirred. The product was isolated by addition of $CH_3CN$, filtration and washing with $CH_3CN$.

That which is claimed is:

1. A polymeric composition comprising repeat units derived from (1) a carbonyl compound, (2) a monomer, and (3) phosphorochloridite wherein said carbonyl compound has the formula selected from the group consisting of $(R^1O_2C)_m(OH)$—$Ar^1$—$(OH)(CO_2R^1)_m$, $(R^1O_2C)_m(OH)$—$Ar^2$—$A^2$—$Ar^2$—$(OH)(CO_2R^1)_m$, $(R^1O_2C)_m(OH)$—$Ar^2$—$Ar^2$—$(OH)(CO_2R^1)_m$ and combinations of two or more thereof;
   said monomer is selected from the group consisting of polyhydric alcohols, amines, and combinations thereof,
   said phosphorochloridite has the formula selected from the group consisting of $ClP(O$—$Ar^2$—$R^2)_2$; the $Ar^2$ groups in $ClP(O$—$Ar^2$—$R^2)_2$ are unlinked to each other, directly linked to each other, or linked to each other through group $A^2$;
   each $Ar^1$ is selected from the group consisting of $C_6$ to $C_{40}$ phenylene group, $C_{12}$ to $C_{40}$ biphenylene group, $C_{10}$ to $C_{40}$ naphthylene group, $C_{20}$ to $C_{40}$ binaphthylene group, and combinations of two or more thereof;
   each $Ar^2$ is independently selected from the group consisting of $C_6$ to $C_{40}$ phenylene group, $C_{10}$ to $C_{40}$ naphthylene group, and combinations thereof;
   $A^2$ is selected from the group consisting of —$C(R^1)(R^1)$, —O—, —$N(R^1)$—, —S—, —$S(O)_2$—, —$S(O)$—, and combinations of two or more thereof;
   each $R^1$ is independently selected from the group consisting of hydrogen, $C_1$ to $C_{12}$ alkyl group or cycloalkyl group, $C_6$ to $C_{20}$ aryl group, and combinations of two or more thereof;
   each $R^2$ is independently selected from the group consisting of hydrogen, $C^1$ to $C^{12}$ alkyl or cycloalkyl group, acetal, ketal, —$OR^3$, —$CO_2R^3$, $C_6$ to $C_{20}$ aryl group, F, Cl, —$NO_2$, —$SO3R^3$, —CN, perhaloalkyl, —$S(O)R^3$, —$S(O)_2R^3$, —CHO, —$C(O)R^3$, cyclic ether, —$A^1Z$, and combinations of two or more thereof;
   $A^1$ is a $C_1$ to $C_{12}$ alkylene group;
   Z is selected from the group consisting of —$CO_2R^3$, —CHO, —$C(O)R^3$, —$C(O)SR^3$, —$SR3$, —$C(O)NR1R1$, —$OC(O)R3$, —$OC(O)OR3$, —N═$C(R^1)R^1$, —$C(R^1)$═$NR^1$, —$C(R^1)$═N—O—$R^1$, —$P(O)(OR^3)(OR^3)$, —$S(O)_2R^3$, —$S(O)R^3$, —$C(O)OC(O)R^3$, —$NR^3CO_2R^3$, —$NR^3C(O)N(R^1)R^1$, F, Cl, —$NO_2$, —$SO_3R^3$, —CN, and combinations of two or more thereof;
   each $R^3$ is independently selected from the group consisting of $C_1$ to $C_{12}$ alkyl or cycloalkyl group, $C_6$ to $C_{20}$ aryl group, and combinations thereof; and
   each m is independently a number in the range of from 1 to 2.

2. A composition according to claim 1 wherein $R^2$ in $ClP(O-Ar^2-R^2)_2$ is ortho to the oxygen attached to phosphorus.

3. A composition according to claim 1, or 2 wherein said monomer is a polyhydric alcohol selected from the group consisting of dialcohols, trialcohols, tetraalcohols, and combinations of two or more thereof.

4. A composition according to claim 1, 2, or 3 wherein said polyhydric alcohol has the formula selected from the group consisting of $(HO)_m-A^1-(OH)_m$, $(HO)_m-Ar^2-A^1-Ar^2-(OH)_m$, $(HO)_m-Ar^2-(O)-A^1-(O)-Ar^2-(OH)_m$, $(HO)_m-(A^1-O)_p-A^1-(OH)_m$, $(HO-A^1)_m(OH)-Ar^1-(OH)(A^1-OH)_m$, $(HO-A^1)_m(OH)-Ar^2-A^2-Ar^2-(OH)(A^1-OH)_m$, $(HO-A^1)_m(OH)-Ar^2-Ar^2-(OH)(A^1-OH)_m$, $(HO)_m-Ar^2-(O-A^1)_p-O-Ar^2-(OH)_m$, $(OH)_m-Ar^2-Ar^2-(OH)_m$, $(OH)_m-Ar^2-Ar^2-(OH)_m$, $(HO)_m-Ar^2-A^1-C(O)-O-A^1-O-C(O)-A^1-Ar^2-(OH)_m$, $(OH)-Ar^1-(OH)$, and combinations of two or more thereof;

$Ar^1$, $Ar^2$, $A^2$, and m are the same as recited in claim 1;
each $A^1$ is independently a $C_1$ to $C_{12}$ alkylene group; and
each p is independently a number in the range of from 1 to 10.

5. A composition according to claim 4 wherein said polyhydric alcohol is selected from the group consisting of 1,3-propananediol, tetra(ethylene glycol), 1,6-hexanediol, 1,4-cyclohexanediol, 2,6-dihydroxynaphthalene, hexa(ethylene glycol), and combinations of two or more thereof.

6. A composition according to claim 1 wherein said monomer is an amine selected from the group consisting of 1,6-hexadiamine, N,N'-dimethyhexanediamine, 1,4-butanediamine, and combinations of two or more thereof.

7. A composition according to any of claims 1 to 6 wherein said carbonyl compound is selected from the group consisting of

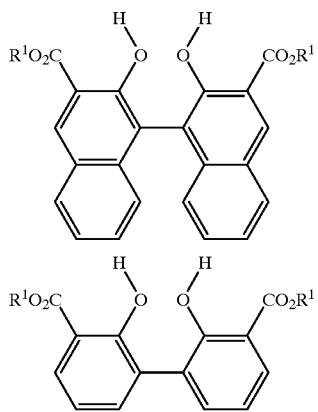

and combinations thereof; and each $R^1$ is the same as recited in claim 1.

8. A composition according to claim 7 wherein said carbonyl compound is selected from the group consisting of diallyl 2,2'-dihydroxyl-1,1'-binaphthalene-3,3'-dicarboxylate, dialkyl 2,2'-dihydroxyl-1,1'-biphenyl-3,3'-dicarboxylate, 2,2'-dihydroxy-biphenyl-3,3'-dicarboxylic acid, 2,2'-dihydroxy-1,1'-binaphthyl-3,3'-dicarboxylic acid and combinations of two or more thereof.

9. A composition according to any of claims 1 to 8 wherein said carbonyl compound is blended with one or more second carbonyl compounds selected from the group consisting of $(R^1O_2C)_m-Ar^1-(CO_2R^1)_m$, $(R^1O_2C)_m-A^1-(CO_2R^1)_m$, $(R^1O_2C)_m-Ar^2-A^1-Ar^2-(CO_2R^1)_m$, $(R^1O_2C)_m-Ar^2-(O)-A^1-(O)-Ar^2-(CO_2R^1)_m$, $(R^1O_2C)_m-(A^1-O)_p-A^1-(CO_2R^1)_m$, and combinations of two or more thereof.

10. A composition according to claim 9 wherein said second carbonyl compound is selected from the group consisting of terephthalic acid, isophthalic acid, phthalic acid, dimethyl isophthalate, dimethyl phthalate, dimethyl terephthalate, 1,3,5-benzenetricarboxylic acid, and combinations of two or more thereof.

11. A process comprising (1) contacting a carbonyl compound with a monomer to produce an intermediate and (2) contacting said intermediate with a phosphorchloridite wherein said carbonyl compound has the formula selected from the group consisting of $(R^1O_2C)_m(OH)-Ar^1-(OH)(CO_2R^1)_m$, $(R^1O_2C)_m(OH)-Ar^2-A^2-Ar^2-(OH)(CO_2R^1)_m$, $(R^1O_2C)_m(OH)-Ar^2-Ar^2-(OH)(CO_2R^1)_m$ and combinations of two or more thereof;

said monomer is selected from the group consisting of polyhydric alcohols, amines, and combinations thereof;

said phosphorochloridite has the formula selected from the group consisting of $ClP(O-Ar^2-R^2)_2$; the $Ar^2$ groups in $ClP(O-Ar^2-R^2)_2$ are unlinked to each other, directly linked to each other, or linked to each other through group $A^2$;

each $Ar^1$ is selected from the group consisting of phenylene group, biphenylene group, naphthylene group, binaphthylene group, and combinations of two or more thereof;

each $Ar^2$ is independently selected from the group consisting of phenylene group, naphthylene group, and combinations thereof;

$A^2$ is selected from the group consisting of $-C(R^1)(R^1)-$, $-O-$, $-N(R^1)-$, $-S-$, $-S(O)_2-$, $-S(O)-$, and combinations of two or more thereof;

each $R^1$ is independently selected from the group consisting of hydrogen, $C_1$ to $C_{12}$ alkyl or cycloalkyl group, $C_6$ to $C_{20}$ aryl group, and combinations of two or more thereof;

each $R^2$ is independently selected from the group consisting of hydrogen, $C_1$ to $C_{12}$ alkyl or cycloalkyl group, acetal, ketal, $-OR^3$, $-CO_2R^3$, $C_6$ to $C_{20}$ aryl group, F, Cl, $-NO_2$, $-SO_3R^3$, $-CN$, perhaloalkyl, $-S(O)R^3$, $-S(O)_2R^3$, $-CHO$, $-C(O)R^3$, cyclic ether, $-A^1Z$, and combinations of two or more thereof;

Z is selected from the group consisting of $-CO_2R^3$, $-CHO$, $-C(O)R^3$, $-C(O)SR^3$, $-SR^3$, $-C(O)NR^1R^1$, $-OC(O)R^3$, $-OC(O)OR^3$, $-N=C(R^1)R^1$, $-C(R^1)=NR^1$, $-C(R^1)=N-O-R^1$, $-P(O)(OR^3)(OR^3)$, $-S(O)_2R^3$, $-S(O)R^3$, $-C(O)OC(O)R^3$, $-NR^3CO_2R^3$, $-NR^3C(O)N(R^1)R^1$, F, Cl, $-NO_2$, $-SO_3R^3$, $-CN$, and combinations of two or more thereof;

$A^1$ is a $C_1$ to $C^{12}$ alkylene group;

each $R^3$ is independently selected from the group consisting of $C_1$ to $C_{12}$ alkyl or cycloalkyl group, $C_6$ to $C_{20}$ aryl group, and combinations thereof; and each m is independently a number in the range of from 1 to 2.

12. A process according to claim 11 wherein $R^2$ in $ClP(O-Ar^2-R^2)_2$ is ortho to the oxygen attached to phosphorus.

13. A process according to claim 11 or 12 wherein said monomer is a polyhydric alcohol selected from the group consisting of dialcohols, trialcohols, tetraalcohols, and combinations of two or more thereof.

14. A process according to claim 11, 12, or 13 wherein said polyhydric alcohol has the formula selected from the group consisting of $(HO)_m$—$A^1$—$(OH)_m$, $(HO)_m$—$Ar^2$—$A^1$—$Ar^2$—$(OH)_m$, $(HO)_m$—$Ar^2$—$(O)$—$A^1$—$(O)$—$Ar^2$—$(OH)_m$, $(HO)_m$—$(A^1$—$O)_p$—$A^1$—$(OH)_m$, $(HO$—$A^1)_m$ $(OH)$—$Ar^1$—$(OH)(A^1$—$OH)_m$, $(HO$—$A^1)_m(OH)$—$Ar^2$—$A^2$—$Ar^2$—$(OH)(A^1$—$OH)_m$, $(HO$—$A^1)_m(OH)$—$Ar^2$—$Ar^2$—$(OH)(A^1$—$OH)_m$, $(HO)_m$—$Ar^2$—$(O$—$A^1)_p$—$O$—$Ar^2$—$(OH)_m$, $(OH)_m$—$Ar^2$—$Ar^2$—$(OH)_m$, $(OH)_m$—$Ar^2$—$A^2$—$Ar^2$—$(OH)_m$, $(HO)_m$—$Ar^2$—$A^1$—$C(O)$—$O$—$A^1$—$O$—$C(O)$—$A^1$—$Ar^2$—$(OH)_m$, $(OH)$—$Ar^1$—$(OH)$, and combinations of two or more thereof;

$Ar^1$, $Ar^2$, $A^2$, and m are the same as recited in claim 22;

each $A^1$ is independently a $C_1$ to $C_{12}$ alkylene group; and each p is independently a number in the range of from 1 to 10.

15. A process according to claim 14 wherein said polyhydric alcohol is selected from the group consisting of 1,3-propananediol, tetra(ethylene glycol), 1,6-hexanediol, 1,4-cyclohexanediol, 2,6-dihydroxynaphthalene, hexa(ethylene glycol), and combinations of two or more thereof.

16. A process according to claim 11 wherein said monomer is said amine selected from the group consisting of 1,6-hexadiamine, N,N'-dimethylhexanediamine, 1,4butanediamine, and combinations of two or more thereof.

17. A process according to any of claims 11 to 16 wherein said carbonyl compound is selected from the group consisting of

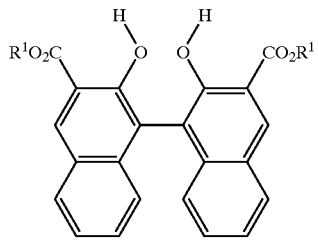

-continued

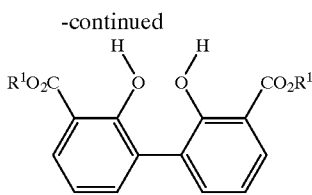

and combinations thereof; and each $R^1$ is the same as recited in claim 11.

18. A process according to claim 17 wherein said carbonyl compound is selected from the group consisting of dialkyl 2,2'-dihydroxyl-1,1'-binaphthalene-3,3'-dicarboxylate, dialkyl 2,2'-dihydroxyl-1,1'-biphenyl-3,3'-dicarboxylate, 2,2'-dihydroxy-biphenyl-3,3'-dicarboxylic acid, 2,2'-dihydroxy-1,1'-binaphthyl-3,3'-dicarboxylic acid and combinations of two or more thereof.

19. A process according to any of claims 11 to 18 wherein said carbonyl compound is blended with a second carbonyl compound.

20. A process according to claim 19 wherein said second carbonyl compound is selected from the group consisting of terephthalic acid, isophthalic acid, phthalic acid, dimethyl isophthalate, dimethyl phthalate, dimethyl terephthalate, 1,3,5-benzenetricarboxylic acid, and combinations of two or more thereof.

21. A process according to any of claims 11 to 20 wherein said contacting in step (1) is carried out at a temperature in the range of from about 100° C. to about 450° C.; said contacting in step (2) is carried out at a temperature in the range of from about −50° C. to about 150° C.; and the ratio of said phosphorochloridite to the alcohol group of said intermediate is in the range of from about 10:1 to about 0.5:1.

22. A process according to claim 21 wherein said contacting in step (1) is carried out at a temperature in the range of from 180° C. to 270° C. for about 1 minute to about 24 hours; said contacting in step (2) is carried out at a temperature in the range of from −30° C. to about 80° C. for about 1 minute to about 24 hours; the ratio of said phosphorochloridite to the alcohol group of said intermediate is about 1:1; and said process is carried out in the presence of an organic base.

* * * * *